(12) United States Patent
Carmel et al.

(10) Patent No.: US 8,452,110 B2
(45) Date of Patent: May 28, 2013

(54) CLASSIFYING AN IMAGE'S COMPRESSION LEVEL

(75) Inventors: Sharon Carmel, Ramat Hasharon (IL); Dror Gill, Haifa (IL); Tamar Shoham, Netanya (IL)

(73) Assignee: I.C.V.T. Ltd., Tel-Aviv (IL)

( * ) Notice: Subject to any disclaimer, the term of this patent is extended or adjusted under 35 U.S.C. 154(b) by 166 days.

(21) Appl. No.: 13/077,060

(22) Filed: Mar. 31, 2011

(65) Prior Publication Data

US 2011/0222786 A1 Sep. 15, 2011

Related U.S. Application Data

(63) Continuation-in-part of application No. PCT/IL2010/000809, filed on Oct. 5, 2010.

(60) Provisional application No. 61/248,521, filed on Oct. 5, 2009, provisional application No. 61/253,872, filed on Oct. 22, 2009, provisional application No. 61/383,750, filed on Sep. 17, 2010, provisional application No. 61/329,217, filed on Apr. 29, 2010, provisional application No. 61/302,193, filed on Feb. 8, 2010, provisional application No. 61/292,622, filed on Jan. 6, 2010.

(51) Int. Cl.
*G06K 9/36* (2006.01)
(52) U.S. Cl.
USPC ........................................................... 382/232
(58) Field of Classification Search
CPC .... G06K 9/00; G06K 9/36; G06K 9/46; G06K 9/48; H04N 7/12; H04N 11/02; H04N 11/04
USPC ........... 382/232–233, 244–251; 358/426.14; 348/387.1, 390.1, 395.1, 403.1; 375/240.18–240.2, E7.144, E7.154
See application file for complete search history.

(56) References Cited

U.S. PATENT DOCUMENTS

| 5,157,488 | A |   | 10/1992 | Pennebaker |
| 5,426,512 | A |   | 6/1995 | Watson |
| 5,629,780 | A |   | 5/1997 | Watson |
| 5,689,346 | A | * | 11/1997 | Noda et al. ............... 358/426.11 |
| 5,734,755 | A |   | 3/1998 | Ramchandran et al. |

(Continued)

FOREIGN PATENT DOCUMENTS

WO 2008081461 A2 7/2008
WO 2011042900 A1 4/2011

OTHER PUBLICATIONS

S. Cho, Z. Bojkovic, D. Milovanovic, J. Lee and J. Hwang, "image quality evaluation: JPEG2000 versus Intra-only H.264/AVC High Profile", Facta Universitatis Elec. Engerg., vol. 20, No. 1, 71-83 (Apr. 2007).

(Continued)

*Primary Examiner* — Jose Couso
(74) *Attorney, Agent, or Firm* — Harness, Dickey & Pierce, PLC

(57) ABSTRACT

A method of classifying a compressed input image's compression level, comprising applying inverse quantization to DCT coefficients extracted from the compressed input image, giving rise to dequantized DCT coefficients, applying a threshold to the dequantized DCT coefficients, and determining a compression level classification for the compressed input image according to a relation among the threshold and at least one of the dequantized DCT coefficients.

30 Claims, 11 Drawing Sheets

U.S. PATENT DOCUMENTS

| | | | |
|---|---|---|---|
| 5,739,457 | A | 4/1998 | Devecka |
| 5,774,593 | A * | 6/1998 | Zick et al. ............... 382/236 |
| 5,790,717 | A | 8/1998 | Judd |
| 5,854,799 | A * | 12/1998 | Okada et al. .............. 714/781 |
| 5,920,343 | A * | 7/1999 | Watanabe et al. .......... 348/222.1 |
| 6,018,121 | A | 1/2000 | Devecka |
| 6,154,493 | A * | 11/2000 | Acharya et al. ........ 375/240.19 |
| 6,225,547 | B1 | 5/2001 | Toyama et al. |
| 6,233,359 | B1 | 5/2001 | Ratnakar et al. |
| 6,252,994 | B1 | 6/2001 | Nafarieh |
| 6,347,998 | B1 | 2/2002 | Yoshitomi |
| 6,369,313 | B2 | 4/2002 | Devecka |
| 6,390,923 | B1 | 5/2002 | Yoshitomi et al. |
| 6,425,822 | B1 | 7/2002 | Hayashida et al. |
| 6,614,942 | B1 | 9/2003 | Meier |
| 6,645,067 | B1 | 11/2003 | Okita et al. |
| 6,835,887 | B2 | 12/2004 | Devecka |
| 6,982,762 | B1 | 1/2006 | Hui |
| 7,027,507 | B2 * | 4/2006 | Wu ....................... 375/240.03 |
| 7,054,964 | B2 * | 5/2006 | Chan et al. .................. 710/65 |
| 7,092,578 | B2 | 8/2006 | Kakarala et al. |
| 7,391,809 | B2 * | 6/2008 | Li et al. ................. 375/240.12 |
| 7,430,330 | B2 | 9/2008 | Hamilton |
| 7,580,579 | B2 | 8/2009 | Wang et al. |
| 2001/0019630 | A1 | 9/2001 | Johnson |
| 2001/0028743 | A1 | 10/2001 | Kostrzewski et al. |
| 2003/0035586 | A1 | 2/2003 | Chou et al. |
| 2005/0175093 | A1 | 8/2005 | Haskell et al. |
| 2006/0050972 | A1 | 3/2006 | Reznic et al. |
| 2006/0083309 | A1 | 4/2006 | Schwarz et al. |
| 2008/0175491 | A1 | 7/2008 | Kondo |
| 2009/0201316 | A1 | 8/2009 | Bhatt et al. |
| 2009/0202164 | A1 | 8/2009 | Rossato et al. |
| 2009/0204894 | A1 | 8/2009 | Bhatt et al. |
| 2009/0204895 | A1 | 8/2009 | Bhatt et al. |

OTHER PUBLICATIONS

F. De Simone, M. Ouaret, F. Dufaux, A.G. Tescher, and T. Ebrahimi, "A comparative study of JPEG 2000, AVC/H.264, and HD Photo", Applications of Digital Image Processing XXX, Proceedings of SPIE, vol. 6696, San Diego, CA USA, Aug. 28-30, 2007.

Ismail Dalgic, Fouad A. Tobagi, "Constant Quality Video Encoding", Proc. of IEEE ICC'95, Seattle, Washington, Jun. 1995.

I. Matsuda, Y. Nomoto, K. Wakabayashi and S. Itoh, "Lossless Re-encoding of JPEG Images Using Block- Adaptive Intra Prediction" Proc. of 16th European Signal Processing Conference (EUSIPCO 2008), Lausanne, Switzerland, L3-6, Aug. 25-29, 2008.

Anthony J Maeder, Birgit M Planitz, "Medical Image Watermarking for Multiple Modalities," aipr, pp. 158-165, 34th Applied Imagery and Pattern Recognition Workshop (AIPR'05), 2005.

Z.Wang, A.C.Bovik, H.R.Sheikh, E.P. Simoncelli, "Image Quality Assessment: From Error Visibility to Structural Similarity", IEEE Transactions on Image Processing, vol. 13, No. 4, pp. 600-612, Apr. 2004.

M. Martinez-Rach, O. Lopez, P. Pinol, M.P. Malumbres and J. Oliver, "A Study of Objective Quality Assessment Metrics for Video Codec Design and Evaluation", IEEE International Symposium on Multimedia, pp. 517-524, Dec. 2006 (ISM'06).

A. Ouled Zaid, A. Makhloufi, A. Bouallegue, C. Oliver, "JP3D compressed-domain watermaking of still and volumetric medical images", Signal, Image and Video Processing, vol. 4, No. 1, 11-21 (2010).

A. Basso, I. Dalgic, Fouad A. Tobagi and C. J. Van den Branden Lambrecht, "Feedback-control scheme for low-latency constant-quality MPEG-2 video encoding", Proc. SPIE 2952, 460 (1996); doi:10.1117/12.251307 (Sep. 1998).

http://web.archive.org/web/20090228194214/http://infima-compression.com/images (Sep. 16, 2009).

http://my.smithmicro.com/stuffitcompression/imagecompression.html (Sep. 16, 2009).

http://www.winsoftmagic.com/ajc_features.html (Sep. 16, 2009).

http://www.facebook.com/note.php?note_id=76191543919 (Sep. 30, 2009).

http://www.accusoft.com/jpegwizard.htm, 2011.

http://en.wikipedia.org/wiki/H.264/MPEG-4_AVC (Dec. 13, 2009).

http://en.wikipedia.org/wiki/JPEG, 2011.

Ramos, M. de Queiroz, R.L., "Adaptive rate-distortion-based thresholding: application in JPEG compression of mixed images for printing", Acoustics, Speech and Signal Processing, 1999, vol. 5.

Kannan Ramchandran and Martin Vetterli, "Rate-Distortion Optimal Fast Thresholing with Comlete JPEG/MPEG Decoder compatability", IEEE Transactions on Image Processing, vol. 3, No. 5 (Sep. 1994).

B. Planitz, A. Maeder; "Medical Image Watermarking: A Study on Image Degradation", Feb. 12, 2005.

Takeo Omori, et al.; "Novel Inspection Technology for Half Pitch 55 nm and Below"; SPIE vol. 5752, pp. 174-182, 2005.

Ruth Rosenholtz & Andrew B. Watson, "Perceptual adaptive JPEG coding", IEEE International Conference on Image Processing, Lausanne, Switzerland, vol. 1, pp. 901-904, 1996.

Andrew B. Watson, "Perceptual optimization of DCT color quantization matrices ", Proceedings of IEEE International Conference on Image Processing, Austin, TX, IEEE Computer Society Press, pp. 100-104, (1994).

Andrew B. Watson, "DCTune: A Technique for visual optimization of DCT quantization matrices for individual images", Society for Information Display Digest of Technical Papers XXIV, 946-949, (1993).

Andrew B. Watson, "DCT quantization matrices visually optimized for individual images",Proceedings of Human Vision, Visual Processing, and Digital Display IV, Bellingham, WA, SPIE, pp. 202-216, (1993).

Andrew B. Watson, "Visually optimal DCT quantization matrices for individual images ", Data Compression Conference, 1993. DCC '93. Mar. 30-Apr. 2, 1993 pp. 178-187, (1993).

Albert J. Ahumada Jr. & Heidi A. Peterson, "Luminance-model-based DCT quantization for color image compression ", SPIE Proceedings, pp. 365-374, 1992.

Albert J. Ahumada Jr., "Computational image quality metrics: A review", Society for Information Display International Symposium Digest of Technical Papers, ed. J. Morreale, vol. 24, pp. 305-308. Santa Ana, CA, 1993.

H.R.Sheikh, A.C. Bovik, "Image information and visual quality", IEEE Transactions on Image Processing, vol. 15, No. 2, pp. 430-444, Feb. 2006.

Ora Gendler and Moshe Porat,"Toward optimal real-time transcoding using requantization in the DCT domain", 6th IEEE International Conference on Image Processing, (ICIP), pp. 3677-3680 , Nov. 7-10, 2009.

Ora Gendler and Moshe Porat,"On efficient quantization for image recompression",17th European Signal Processing Conference, Glasgow, Scotland, Aug. 24-28, 2009.

Heinz H. Bauschke, Christopher H. Hamilton, Mason S. Macklem, Justin S. McMichael, and Nicholas R. Swart, "Recompression of JPEG Images by Requantization", IEEE transactions on Image Processing, vol. 12 (7), pp. 843-849, Jul. 2003.

T. Richter, "On the mDCT-PSNR image quality index", International Workshop on Quality of Multimedia Experience (QoMEX) 2009, pp. 53-58, Germany, Jul. 2009.

Z. Wang, E.P. Simoncelli and A.C. Bovik, "Multi-scale structural similarity for image quality assessment", Proc. 37th IEEE Asilomar conference on Signals, Systems and Computers, pp. 1398-1402, New-York, USA, Nov. 2003.

W. Lin, C.-C Jay Kuo, "Perceptual visual quality metrics: A survey", J. Visual Communications (2011), doi:10.1016/j.jvcir.2011.01.005.

George A. Triantafyllidis, "Image quality measurement in the frequency domain",4th International Symposiumon on Communications, Control and Signal Processing (ISCCSP), 2010, pp. 1-4, Greece, Mar. 2010.

M. Crouse and L. Ramchandran, "Joint thresholding and quantizer selection for decoder-compatible baseline JPEG", Int. conf. on Acoustics, Speech, and Signal Processing (ICASSP) 1995, vol. 4, pp. 2231-2234, May 1995.

R. Kakarala, R. Bagadi, "A method for signalling block-adaptive quantization in baseline sequential JPEG",' Proceedings of IEEE Tencon, Singapore, 2009.

Adriaan Barri, Ann Dooms, Peter Schelkens, "Combining the Best of Perceptual Quality Metrics", Proceedings of the Sixth International Workshop on Video Processing and Quality Metrics (VPQM), 2012.

Nikolay Ponomarenko, Alexander Zemlyachenko, Vladimir Lukin, Karen Egiazarian and Jaakko Astola, "Performance Analysis of Visually Lossless Image Compression", Proceedings of the Sixth International Workshop on Video Processing and Quality Metrics (VPQM), 2012.

Paolo Gastaldoa and Judith A. Redib, "Machine Learning Solutions for Objective Visual Quality Assessment", Proceedings of the Sixth International Workshop on Video Processing and Quality Metrics (VPQM), 2012.

Ricky D. Nguyen, "Rate Control and Bit Allocation for JPEG Transcoding", Master of Engineering Thesis at MIT, May 2007.

Track Duy Tran, "A Locally Adaptive Perceptual Masking Threshold Model for Image Coding", Master of Science Thesis at MIT, May 1994.

Michael P. Eckert and Andrew P. Bradley, "Perceptual quality metrics applied to still image compression", Journal of Signal Processing—Special issue on image and video quality metrics, vol. 70 Issue 3, Nov. 1998, pp. 177-200.

A Novel Perceptual Image Quality Measure for Block Based Image Compression Tamar Shoham, Dror Gill,, Sharon Carmel, presented at the SPIE 2011 conference in San Francisco, Jan. 24, 2011.

"Optimizing Bandwidth and Storage Requirements for Mobile Images Using Perceptual-Based JPEG Recompression", Tamar Shoham, Dror Gill,, Sharon Carmel, presented at the SPIE 2011 conference in San Francisco, Jan. 24, 2011.

* cited by examiner

| 87 | 91 | 96 | 104 | 107 | 109 | 105 | 102 | 100 | 100 | 97 | 97 | 97 | 99 | 94 | 88 |
|---|---|---|---|---|---|---|---|---|---|---|---|---|---|---|---|
| 84 | 87 | 93 | 99 | 104 | 105 | 105 | 103 | 103 | 103 | 100 | 97 | 94 | 94 | 91 | 89 |
| 84 | 85 | 88 | 91 | 93 | 99 | 102 | 106 | 105 | 105 | 101 | 98 | 92 | 92 | 91 | 91 |
| 80 | 83 | 86 | 88 | 89 | 92 | 97 | 99 | 102 | 101 | 100 | 99 | 95 | 95 | 93 | 93 |
| 76 | 81 | 87 | 89 | 91 | 90 | 91 | 91 | 99 | 98 | 97 | 99 | 102 | 101 | 95 | 95 |
| 79 | 81 | 84 | 85 | 87 | 89 | 90 | 93 | 96 | 95 | 96 | 100 | 103 | 101 | 97 | 95 |
| 83 | 82 | 82 | 81 | 84 | 87 | 90 | 92 | 95 | 93 | 94 | 98 | 100 | 99 | 96 | 97 |
| 79 | 80 | 83 | 86 | 88 | 88 | 86 | 84 | 93 | 92 | 93 | 96 | 97 | 96 | 96 | 100 |
| 69 | 70 | 72 | 77 | 80 | 84 | 85 | 88 | 91 | 95 | 99 | 101 | 102 | 100 | 100 | 100 |
| 80 | 79 | 78 | 78 | 81 | 85 | 87 | 90 | 92 | 96 | 100 | 101 | 102 | 100 | 100 | 98 |
| 82 | 85 | 87 | 87 | 88 | 88 | 87 | 87 | 92 | 94 | 98 | 98 | 99 | 98 | 97 | 97 |
| 85 | 88 | 90 | 92 | 93 | 91 | 90 | 89 | 89 | 92 | 95 | 95 | 96 | 96 | 96 | 94 |
| 89 | 91 | 89 | 88 | 87 | 89 | 92 | 94 | 87 | 90 | 93 | 93 | 95 | 96 | 97 | 94 |
| 87 | 90 | 90 | 90 | 87 | 87 | 86 | 87 | 85 | 88 | 90 | 89 | 89 | 93 | 94 | 90 |
| 84 | 88 | 91 | 92 | 87 | 83 | 77 | 75 | 80 | 83 | 82 | 83 | 83 | 89 | 90 | 88 |
| 87 | 89 | 89 | 88 | 82 | 79 | 75 | 75 | 78 | 81 | 81 | 81 | 83 | 89 | 91 | 89 |

FIG. 3A

| 723 | -41 | -9 | -2 | -1 | 0 | 1 | 0 | 775 | 13 | -5 | 5 | 1 | -1 | 1 | -2 |
|---|---|---|---|---|---|---|---|---|---|---|---|---|---|---|---|
| 43 | -13 | -7 | 1 | 0 | 1 | 0 | -1 | 0 | 20 | 3 | 0 | -6 | 1 | -1 | -1 |
| 12 | 3 | -7 | 6 | 0 | 0 | 0 | -1 | -6 | -5 | 0 | 1 | 0 | 0 | 0 | 0 |
| 3 | 2 | -5 | 0 | 0 | -1 | 0 | 0 | 4 | -7 | -8 | 7 | 0 | -1 | 0 | 1 |
| -2 | 4 | -8 | 0 | -1 | 0 | -1 | 0 | 0 | -4 | 0 | 1 | 0 | 0 | 0 | 0 |
| 0 | 0 | 9 | 0 | 0 | 0 | 0 | -1 | 0 | 0 | 0 | 0 | 0 | 1 | 0 | 0 |
| 0 | 0 | 0 | 0 | 0 | 0 | 1 | -2 | 0 | 0 | 0 | 0 | 0 | 0 | -1 | 0 |
| 0 | 1 | 1 | 0 | 0 | 0 | 0 | 0 | 1 | 0 | 1 | 1 | 0 | -1 | 0 | 0 |
| 682 | -3 | -6 | -4 | -1 | -1 | 0 | -2 | 740 | -19 | -9 | -2 | -6 | 1 | -1 | 1 |
| -11 | -28 | 8 | 4 | 1 | -1 | 0 | 1 | 42 | 5 | -8 | -3 | 4 | -1 | 0 | 2 |
| -28 | 1 | -2 | 1 | 1 | 0 | 1 | -1 | -8 | -4 | 2 | 0 | 0 | 0 | 0 | -1 |
| -3 | -9 | 4 | 0 | 0 | 0 | 0 | -1 | 3 | 0 | -1 | 0 | -1 | 1 | -1 | 0 |
| -1 | -4 | 2 | 0 | 1 | 0 | -1 | 0 | 0 | -3 | 0 | 0 | 0 | 0 | 0 | 1 |
| -1 | 1 | -11 | 0 | 1 | 0 | 0 | 0 | -5 | 1 | 1 | 0 | 1 | 0 | 0 | -1 |
| 0 | -1 | -1 | -1 | 0 | 0 | 0 | 0 | 1 | 0 | 0 | 0 | 0 | 0 | 1 | 0 |
| -1 | 0 | 0 | -1 | -1 | 0 | 0 | 0 | 0 | -1 | 0 | 0 | 1 | 0 | 0 | 0 |

FIG. 3B

| 45 | -4 | -1 | 0 | 0 | 0 | 0 | 0 | 48 | 1 | -1 | 0 | 0 | 0 | 0 | 0 |
|---|---|---|---|---|---|---|---|---|---|---|---|---|---|---|---|
| 4 | -1 | -1 | 0 | 0 | 0 | 0 | 0 | 0 | 2 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 43 | 0 | -1 | 0 | 0 | 0 | 0 | 0 | 46 | -2 | -1 | 0 | 0 | 0 | 0 | 0 |
| -1 | -2 | 1 | 0 | 0 | 0 | 0 | 0 | 4 | 0 | -1 | 0 | 0 | 0 | 0 | 0 |
| -2 | 0 | 0 | 0 | 0 | 0 | 0 | 0 | -1 | 0 | 0 | 0 | 0 | 0 | 0 | 0 |
| 0 | -1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 3C

| 720 | -44 | -10 | 0 | 0 | 0 | 0 | 0 | 768 | 11 | -10 | 0 | 0 | 0 | 0 | 0 |
|---|---|---|---|---|---|---|---|---|---|---|---|---|---|---|---|
| 48 | -12 | -14 | 0 | 0 | 0 | 0 | 0 | 0 | 24 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 688 | 0 | -10 | 0 | 0 | 0 | 0 | 0 | 736 | -22 | -10 | 0 | 0 | 0 | 0 | 0 |
| -12 | -24 | 14 | 0 | 0 | 0 | 0 | 0 | 48 | 0 | -14 | 0 | 0 | 0 | 0 | 0 |
| -28 | 0 | 0 | 0 | 0 | 0 | 0 | 0 | -14 | 0 | 0 | 0 | 0 | 0 | 0 | 0 |
| 0 | -17 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 87 | 91 | 96 | 104 | 107 | 109 | 105 | 102 | 100 | 100 | 97 | 97 | 97 | 99 | 94 | 88 |
|---|---|---|---|---|---|---|---|---|---|---|---|---|---|---|---|
| 84 | 87 | 93 | 99 | 104 | 105 | 105 | 103 | 103 | 103 | 100 | 97 | 94 | 94 | 91 | 89 |
| 84 | 85 | 88 | 91 | 93 | 99 | 102 | 106 | 105 | 105 | 101 | 98 | 92 | 92 | 91 | 91 |
| 80 | 83 | 86 | 88 | 89 | 92 | 97 | 99 | 102 | 101 | 100 | 99 | 95 | 95 | 93 | 93 |
| 76 | 81 | 87 | 89 | 91 | 90 | 91 | 91 | 99 | 98 | 97 | 99 | 102 | 101 | 95 | 95 |
| 79 | 81 | 84 | 85 | 87 | 89 | 90 | 93 | 96 | 95 | 96 | 100 | 103 | 101 | 97 | 95 |
| 83 | 82 | 82 | 81 | 84 | 87 | 90 | 92 | 95 | 93 | 94 | 98 | 100 | 99 | 96 | 97 |
| 79 | 80 | 83 | 86 | 88 | 88 | 86 | 84 | 93 | 92 | 93 | 96 | 97 | 96 | 96 | 100 |
| 69 | 70 | 72 | 77 | 80 | 84 | 85 | 88 | 91 | 95 | 99 | 101 | 102 | 100 | 100 | 100 |
| 80 | 79 | 78 | 78 | 81 | 85 | 87 | 90 | 92 | 96 | 100 | 101 | 102 | 100 | 100 | 98 |
| 82 | 85 | 87 | 87 | 88 | 88 | 87 | 87 | 92 | 94 | 98 | 98 | 99 | 98 | 97 | 97 |
| 85 | 88 | 90 | 92 | 93 | 91 | 90 | 89 | 89 | 92 | 95 | 95 | 96 | 96 | 96 | 94 |
| 89 | 91 | 89 | 88 | 87 | 89 | 92 | 94 | 87 | 90 | 93 | 93 | 95 | 96 | 97 | 94 |
| 87 | 90 | 90 | 90 | 87 | 87 | 86 | 87 | 85 | 88 | 90 | 89 | 89 | 93 | 94 | 90 |
| 84 | 88 | 91 | 92 | 87 | 83 | 77 | 75 | 80 | 83 | 82 | 83 | 83 | 89 | 90 | 88 |
| 87 | 89 | 89 | 88 | 82 | 79 | 75 | 75 | 78 | 81 | 81 | 81 | 83 | 89 | 91 | 89 |

| 723 | -41 | -9 | -2 | -1 | 0 | 1 | 0 | 775 | 13 | -5 | 5 | 1 | -1 | 1 | -2 |
|---|---|---|---|---|---|---|---|---|---|---|---|---|---|---|---|
| 43 | -13 | -7 | 1 | 0 | 1 | 0 | -1 | 0 | 20 | 3 | 0 | -6 | 1 | -1 | -1 |
| 12 | 3 | -7 | 6 | 0 | 0 | 0 | -1 | -6 | -5 | 0 | 1 | 0 | 0 | 0 | 0 |
| 3 | 2 | -5 | 0 | 0 | -1 | 0 | 0 | 4 | -7 | -8 | 7 | 0 | -1 | 0 | 1 |
| -2 | 4 | -8 | 0 | -1 | 0 | -1 | 0 | 0 | -4 | 0 | 1 | 0 | 0 | 0 | 0 |
| 0 | 0 | 9 | 0 | 0 | 0 | 0 | -1 | 0 | 0 | 0 | 0 | 0 | 1 | 0 | 0 |
| 0 | 0 | 0 | 0 | 0 | 0 | 1 | -2 | 0 | 0 | 0 | 0 | 0 | 0 | -1 | 0 |
| 0 | 1 | 1 | 0 | 0 | 0 | 0 | 0 | 1 | 0 | 1 | 1 | 0 | -1 | 0 | 0 |
| 682 | -3 | -6 | -4 | -1 | -1 | 0 | -2 | 740 | -19 | -9 | -2 | -6 | 1 | -1 | 1 |
| -11 | -28 | 8 | 4 | 1 | -1 | 0 | 1 | 42 | 5 | -8 | -3 | 4 | -1 | 0 | 2 |
| -28 | 1 | -2 | 1 | 1 | 0 | 1 | -1 | -8 | -4 | 2 | 0 | 0 | 0 | 0 | -1 |
| -3 | -9 | 4 | 0 | 0 | 0 | 0 | -1 | 3 | 0 | -1 | 0 | -1 | 1 | -1 | 0 |
| -1 | -4 | 2 | 0 | 1 | 0 | -1 | 0 | 0 | -3 | 0 | 0 | 0 | 0 | 0 | 1 |
| -1 | 1 | -11 | 0 | 1 | 0 | 0 | 0 | -5 | 1 | 1 | 0 | 1 | 0 | 0 | -1 |
| 0 | -1 | -1 | -1 | 0 | 0 | 0 | 0 | 1 | 0 | 0 | 0 | 0 | 0 | 1 | 0 |
| -1 | 0 | 0 | -1 | -1 | 0 | 0 | 0 | 0 | -1 | 0 | 0 | 1 | 0 | 0 | 0 |

FIG. 4B

| 723 | -41 | -9  | 0 | 0 | 0 | 0 | 0 | 775 | 13  | -5 | 5  | 0  | 0 | 0 | 0 |
|-----|-----|-----|---|---|---|---|---|-----|-----|----|----|----|---|---|---|
| 43  | -13 | -7  | 0 | 0 | 0 | 0 | 0 | 0   | 20  | 0  | 0  | -6 | 0 | 0 | 0 |
| 12  | 0   | -7  | 6 | 0 | 0 | 0 | 0 | -6  | -5  | 0  | 0  | 0  | 0 | 0 | 0 |
| 0   | 0   | -5  | 0 | 0 | 0 | 0 | 0 | 0   | -7  | -8 | 7  | 0  | 0 | 0 | 0 |
| 0   | 0   | -8  | 0 | 0 | 0 | 0 | 0 | 0   | 0   | 0  | 0  | 0  | 0 | 0 | 0 |
| 0   | 0   | 9   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 682 | 0   | -6  | 0 | 0 | 0 | 0 | 0 | 740 | -19 | -9 | 0  | -6 | 0 | 0 | 0 |
| -11 | -28 | 8   | 0 | 0 | 0 | 0 | 0 | 42  | 5   | -8 | 0  | 0  | 0 | 0 | 0 |
| -28 | 0   | 0   | 0 | 0 | 0 | 0 | 0 | -8  | 0   | 0  | 0  | 0  | 0 | 0 | 0 |
| 0   | -9  | 0   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 0   | 0   | -11 | 0 | 0 | 0 | 0 | 0 | -5  | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |

FIG. 4C

| 723 | -41 | -9  | 0 | 0 | 0 | 0 | 0 | 775 | 13  | -5 | 5  | 0  | 0 | 0 | 0 |
|-----|-----|-----|---|---|---|---|---|-----|-----|----|----|----|---|---|---|
| 43  | -13 | -7  | 0 | 0 | 0 | 0 | 0 | 0   | 20  | 0  | 0  | -6 | 0 | 0 | 0 |
| 12  | 0   | -7  | 6 | 0 | 0 | 0 | 0 | -6  | -5  | 0  | 0  | 0  | 0 | 0 | 0 |
| 0   | 0   | -5  | 0 | 0 | 0 | 0 | 0 | 0   | -7  | -8 | 7  | 0  | 0 | 0 | 0 |
| 0   | 0   | -8  | 0 | 0 | 0 | 0 | 0 | 0   | 0   | 0  | 0  | 0  | 0 | 0 | 0 |
| 0   | 0   | 9   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 682 | 0   | -6  | 0 | 0 | 0 | 0 | 0 | 740 | -19 | -9 | 0  | -6 | 0 | 0 | 0 |
| -11 | -28 | 8   | 0 | 0 | 0 | 0 | 0 | 42  | 5   | -8 | 0  | 0  | 0 | 0 | 0 |
| -28 | 0   | 0   | 0 | 0 | 0 | 0 | 0 | -8  | 0   | 0  | 0  | 0  | 0 | 0 | 0 |
| 0   | -9  | 0   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 0   | 0   | -11 | 0 | 0 | 0 | 0 | 0 | -5  | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |
| 0   | 0   | 0   | 0 | 0 | 0 | 0 | 0 | 0   | 0   | 0  | 0  | 0  | 0 | 0 | 0 |

FIG. 4D

| 723 | -41 | -9 | 0 | 0 | 0 | 0 | 0 | 775 | 13 | -5 | 5 | 0 | 0 | 0 | 0 |
|---|---|---|---|---|---|---|---|---|---|---|---|---|---|---|---|
| 43 | -13 | -7 | 0 | 0 | 0 | 0 | 0 | 0 | 20 | 0 | 0 | -6 | 0 | 0 | 0 |
| 12 | 0 | -7 | 6 | 0 | 0 | 0 | 0 | -6 | -5 | 0 | 0 | 0 | 0 | 0 | 0 |
| 0 | 0 | -5 | 0 | 0 | 0 | 0 | 0 | 0 | -7 | -8 | 7 | 0 | 0 | 0 | 0 |
| 0 | 0 | -8 | 0 | 0 | 0 | 0 | 0 | 0 | 0 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | 0 | -6 | 0 | 0 | 0 | 0 | 0 | 740 | -19 | -9 | 0 | -6 | 0 | 0 | 0 |
| -11 | -28 | 8 | 0 | 0 | 0 | 0 | 0 | 42 | 5 | -8 | 0 | 0 | 0 | 0 | 0 |
| -28 | 0 | 0 | 0 | 0 | 0 | 0 | 0 | -8 | 0 | 0 | 0 | 0 | 0 | 0 | 0 |
| 0 | -9 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 6A

| 723 | -41 | -9 | -2 | -1 | 0 | 1 | 0 | 775 | 13 | -5 | 5 | 1 | -1 | 1 | -2 |
|---|---|---|---|---|---|---|---|---|---|---|---|---|---|---|---|
| 43 | -13 | -7 | 1 | 0 | 1 | 0 | -1 | 0 | 20 | 3 | 0 | -6 | 1 | -1 | -1 |
| 12 | 3 | -7 | 6 | 0 | 0 | 0 | -1 | -6 | -5 | 0 | 1 | 0 | 0 | 0 | 0 |
| 3 | 2 | -5 | 0 | 0 | -1 | 0 | 0 | 4 | -7 | -8 | 7 | 0 | -1 | 0 | 1 |
| -2 | 4 | -8 | 0 | -1 | 0 | -1 | 0 | 0 | -4 | 0 | 1 | 0 | 0 | 0 | 0 |
| 0 | 0 | 9 | 0 | 0 | 0 | 0 | -1 | 0 | 0 | 0 | 0 | 1 | 0 | 0 | 0 |
| 0 | 0 | 0 | 0 | 0 | 0 | 1 | -2 | 0 | 0 | 0 | 0 | 0 | -1 | 0 | 0 |
| 0 | 1 | 1 | 0 | 0 | 0 | 0 | 1 | 0 | 1 | 1 | 0 | -1 | 0 | 0 | 0 |
| 682 | -3 | -6 | -4 | -1 | -1 | 0 | -2 | 740 | -19 | -9 | -2 | -6 | 1 | -1 | 1 |
| -11 | -28 | 8 | 4 | 1 | -1 | 0 | 1 | 42 | 5 | -8 | -3 | 4 | -1 | 0 | 2 |
| -28 | 1 | -2 | 1 | 1 | 0 | 1 | -1 | -8 | -4 | 2 | 0 | 0 | 0 | 0 | -1 |
| -3 | -9 | 4 | 0 | 0 | 0 | -1 | 0 | 3 | 0 | -1 | 0 | -1 | 1 | -1 | 0 |
| -1 | -4 | 2 | 0 | 1 | 0 | -1 | 0 | 0 | -3 | 0 | 0 | 0 | 0 | 0 | 1 |
| -1 | 1 | -11 | 0 | 1 | 0 | 0 | 0 | -5 | 1 | 1 | 0 | 1 | 0 | 0 | -1 |
| 0 | -1 | -1 | -1 | 0 | 0 | 0 | 0 | 1 | 0 | 0 | 0 | 0 | 0 | 1 | 0 |
| -1 | 0 | 0 | -1 | -1 | 0 | 0 | 0 | 0 | -1 | 0 | 0 | 1 | 0 | 0 | 0 |

| 723 | -41 | -9 | -2 | 0 | 0 | 0 | 0 | 775 | 13 | -5 | 5 | 0 | 0 | 0 | -2 |
|---|---|---|---|---|---|---|---|---|---|---|---|---|---|---|---|
| 43 | -13 | -7 | 0 | 0 | 0 | 0 | 0 | 0 | 20 | 3 | 0 | -6 | 0 | 0 | 0 |
| 12 | 3 | -7 | 6 | 0 | 0 | 0 | 0 | -6 | -5 | 0 | 0 | 0 | 0 | 0 | 0 |
| 3 | 2 | -5 | 0 | 0 | 0 | 0 | 0 | 4 | -7 | -8 | 7 | 0 | 0 | 0 | 0 |
| -2 | 4 | -8 | 0 | 0 | 0 | 0 | 0 | 0 | -4 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | -2 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | -3 | -6 | -4 | 0 | 0 | 0 | -2 | 740 | -19 | -9 | -2 | -6 | 0 | 0 | 0 |
| -11 | -28 | 8 | 4 | 0 | 0 | 0 | 0 | 42 | 5 | -8 | -3 | 4 | 0 | 0 | 2 |
| -28 | 0 | -2 | 0 | 0 | 0 | 0 | 0 | -8 | -4 | 2 | 0 | 0 | 0 | 0 | 0 |
| -3 | -9 | 4 | 0 | 0 | 0 | 0 | 0 | 3 | 0 | 0 | 0 | 0 | 0 | 0 | 0 |
| 0 | -4 | 2 | 0 | 0 | 0 | 0 | 0 | 0 | -3 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

← 616

| 1204 | -20 | 0 | 3 | 0 | -5 | 0 | 0 |
|---|---|---|---|---|---|---|---|
| -30 | 44 | 0 | 0 | 0 | 3 | 0 | 0 |
| 57 | -28 | -13 | 0 | 0 | 0 | 0 | 0 |
| -16 | 13 | 5 | 0 | 0 | 0 | 0 | 0 |
| 15 | -6 | -5 | 0 | 0 | 0 | 0 | 0 |
| -9 | 0 | 6 | 0 | 0 | 0 | 0 | 0 |
| 0 | 0 | 0 | 0 | 0 | 0 | 0 | 0 |
| 4 | 0 | -4 | 0 | 0 | 0 | 0 | 0 |

← 626

| 1707 | 6 | 0 | 0 | 0 | 0 | 0 | 0 |
|---|---|---|---|---|---|---|---|
| 8 | 7 | 0 | 0 | 0 | 0 | 0 | 0 |
| 0 | -3 | 3 | 0 | 0 | 0 | 0 | 0 |
| 0 | 0 | 3 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| -4 | 0 | 0 | 0 | 0 | 0 | 0 | 0 |
| 0 | 0 | 0 | 0 | 0 | 0 | 0 | 0 |

FIG. 6C

| 723 | -41 | -9 | -2 | 0 | 0 | 0 | 0 | 775 | 13 | -5 | 5 | 0 | 0 | 0 | -2 |
|---|---|---|---|---|---|---|---|---|---|---|---|---|---|---|---|
| 43 | -13 | -7 | 0 | 0 | 0 | 0 | 0 | 0 | 20 | 3 | 0 | -6 | 0 | 0 | 0 |
| 12 | 3 | -7 | 6 | 0 | 0 | 0 | 0 | -6 | -5 | 0 | 0 | 0 | 0 | 0 | 0 |
| 3 | 2 | -5 | 0 | 0 | 0 | 0 | 0 | 4 | -7 | -8 | 7 | 0 | 0 | 0 | 0 |
| -2 | 4 | -8 | 0 | 0 | 0 | 0 | 0 | 0 | -4 | 0 | 0 | 0 | 0 | 0 | 0 |
| 0 | 0 | 9 | 0 | 0 | 0 | 0 | 0 | 0 | 0 | 0 | 0 | 0 | 0 | 0 | 0 |
| 0 | 0 | 0 | 0 | 0 | 0 | 0 | -2 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 682 | -3 | -6 | -4 | 0 | 0 | 0 | -2 | 740 | -19 | -9 | -2 | -6 | 0 | 0 | 0 |
| -11 | -28 | 8 | 4 | 0 | 0 | 0 | 0 | 42 | 5 | -8 | -3 | 4 | 0 | 0 | 2 |
| -28 | 0 | -2 | 0 | 0 | 0 | 0 | 0 | -8 | -4 | 2 | 0 | 0 | 0 | 0 | 0 |
| -3 | -9 | 4 | 0 | 0 | 0 | 0 | 0 | 3 | 0 | 0 | 0 | 0 | 0 | 0 | 0 |
| 0 | -4 | 2 | 0 | 0 | 0 | 0 | 0 | 0 | -3 | 0 | 0 | 0 | 0 | 0 | 0 |
| 0 | 0 | -11 | 0 | 0 | 0 | 0 | 0 | -5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

608

| 1204 | -20 | 0 | 0 | 0 | 0 | 0 | 0 |
|---|---|---|---|---|---|---|---|
| -30 | 44 | 0 | 0 | 0 | 0 | 0 | 0 |
| 57 | -28 | -13 | 0 | 0 | 0 | 0 | 0 |
| -16 | 13 | 0 | 0 | 0 | 0 | 0 | 0 |
| 15 | 0 | 0 | 0 | 0 | 0 | 0 | 0 |
| -9 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

618

| 1707 | 0 | 0 | 0 | 0 | 0 | 0 | 0 |
|---|---|---|---|---|---|---|---|
| 8 | 7 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| File # | YminDCT | CminDCT | Compression Ratio | Highly Compressed? |
|---|---|---|---|---|
| 1 | 1 | 4 | x1.7 | NO |
| 2 | 2 | 7 | x1.05 | YES |
| 3 | 5 | 10 | x1.02 | YES |
| 4 | 1 | 2 | x2.2 | NO |
| 5 | 2 | 2 | x1.4 | NO |
YminDCT: lowest absolute non-zero inverse quantized Luma (Y plane) DCT coefficient
CminDCT: lowest absolute non-zero inverse quantized Chroma (U&V planes) DCT coefficient
FIG. 7
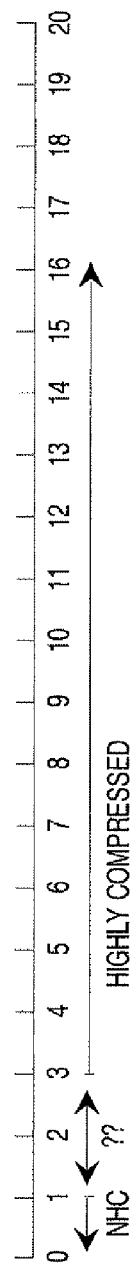
FIG. 8A
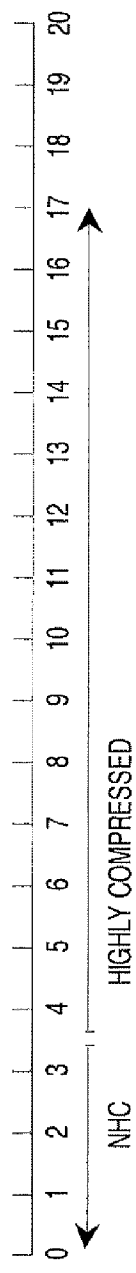
FIG. 8B

CLASSIFYING AN IMAGE'S COMPRESSION LEVEL

CROSS REFERENCE TO RELATED APPLICATIONS

This application is a Continuation-in-Part of PCT Application No. PCT/IL2010/000809,filed Oct. 5, 2010,which is incorporated herein by reference in its entirety. The PCT Application claims priority from the following U.S. Provisional Applications: U.S. Provisional Application No. 61/248,521,filed 5 Oct. 2009; from U.S. Provisional Application No. 61/253,872,filed 22 Oct. 2009; from U.S. provisional appplication No. 61/292,622 filed 6 Jan. 2010; from U.S. Provisional Application No. 61/302,193 filed 8 Feb. 2010; from U.S. Provisional Application No. 61/329,217 filed 29 Apr. 2010,and from U.S. provisional application No. 61/383,750 filed 17 Sep. 2010 all of which are hereby incorporated herein by reference in its entirety.

FIELD OF THE INVENTION

The present invention is in the field of image processing.

BACKGROUND OF THE INVENTION

In Ramesh et al, (2006). "JPEG Compression History Estimation for Color Images", IEEE Transactions on Image Processing, vol. 15,no. 6,it is recognized that an image's compression history ("CH") is often not directly available from its current representation. The example where JPEG images are often imported into Microsoft Powerpoint or Word documents using graphics programs such as Microsoft Clip Gallery and then stored internally using a decompressed format is given. Another example that is given is the conversion of JPEG images to lossless compression formats such as Windows bitmap (BMP) format (say, to create a background image for Windows or to feed a print driver) or Tagged Image File Format (TIFF). In such cases, the JPEG compression settings are discarded after decompression. The authors provide a suggestion for a method of estimating the JPEG CH from a given JPEG-decompressed color image, and refer to the underlying problem as JPEG Compression History Estimation (CHEst).

U.S. Pat. No. 6,233,359 to Ratnaker et al. discloses a technique that reduces the size of an existing PEG file or set of discrete cosine transform (DCT) coefficients to satisfy a certain bit budget by setting to zero coefficients whose magnitude is below a certain threshold and which occur after a certain ordinal number in the zig-zag scan. The cutoff ordinal number is chosen using a clever savings calculation strategy. This strategy is implemented by filling appropriate savings values in an array of savings values, Savings[1], ..., Savings[63]. The value Savings[n] is exactly the number of bits saved by reducing the thresholding cutoff ordinal number from n+1 to n. When a non-zero coefficient is set to zero, bits are saved because two runs of zeros (the one preceding it and the one following it) get combined into a single, longer run of zeros. The exact number of bits saved can be calculated by adding the bits needed to code the previous and next runs, and subtracting the bits needed to code the combined run. Some special conditions (runs longer than 16 and end-of-block conditions) need to be carefully factored into the computation.

SUMMARY OF THE INVENTION

The method or apparatus according to the subject matter of the present application can have features of different aspects described above or below, or their equivalents, in any combination thereof, which can also be combined with any feature or features of the method or apparatus described in the Detailed Description presented below, or their equivalents.

There is provided according to an aspect of the claimed subject matter a method of classifying an image's compression level. According to an example of the claimed subject matter, a method of classifying a compressed input image's compression level can include: applying inverse quantization to DCT coefficients extracted from the compressed input image giving rise to dequantized DCT coefficients; applying a threshold to the dequantized OCT coefficients; and determining a compression level classification for the compressed input image according to a relation among the threshold and at least one of the dequantized DCT coefficients.

Further by way of example, the method can further include identifying a lowest absolute non-zero DCT coefficient among the dequantized DCT coefficients, and wherein the applying a threshold can include applying a threshold to the lowest absolute non-zero DCT coefficient, and wherein the determining a compression level classification, can include determining a compression level classification for the compressed image according to a relation among the threshold and the lowest absolute non-zero DCT coefficient.

Still further by way of example, applying a threshold can include applying a plurality of thresholds which relate to different characteristics or components of the compressed input image.

Yet further by way of example, the threshold can include a threshold that is related to DCT coefficients in the Luma (Y) plane.

Still further by way of example, the plurality of thresholds can include a threshold that is related to DCT coefficients in the Luma (Y) plane. of the compressed input image, and can further include a threshold or thresholds that is/are related to DCT coefficients in each of the Chroma planes (U and V). For example, applying a threshold can include applying a first threshold to the dequantized DCT coefficients in the Luma (Y) plane, and determining a compression level can include classifying the image's compression level as high if its lowest absolute non-zero DCT value in the Luma (Y) plane is above the first threshold. Further by way of example, applying a threshold can include applying a second threshold to the dequantized DCT coefficients in the Luma (Y) plane, and determining a compression level can include classifying the image's compression level as low if its lowest absolute non-zero DCT value in the Luma (Y) plane is below the second threshold. Still further by way of example, in case the image's lowest absolute non-zero DCT value in the Luma (Y) plane is not above the first threshold or below the second threshold, applying a threshold can include applying a third threshold and a fourth threshold to dequantized DCT coefficients in the Chroma U plane and to dequantized DCT coefficients in the Chroma V plane, respectively, and determining a compression level can include classifying the image's compression level as high if its lowest absolute non-zero DCT value in the Chroma U plane is above the respective third threshold and its lowest absolute non-zero DCT value in the Chroma V plane is above the respective fourth threshold. Still further by way of example in case the image's lowest absolute non-zero DCT value in the Luma (Y) plane is not above the first threshold or below the second threshold, applying a threshold can include applying a third threshold and a fourth threshold to dequantized DCT coefficients in the Chroma U plane and to dequantized DCT coefficients in the Chroma V plane, respectively, and determining a compression level can include classifying the image's compression level as low if its lowest absolute non-zero DCT value in the Chroma U plane is below the respective third threshold or its lowest absolute non-zero DCT value in the Chroma V plane is below the respective fourth threshold.

According to an example of the claimed subject matter, the threshold that is used for determining a compression level classification for the compressed input image is related to a perceptual similarity criterion and to a further compression criterion. For example, the threshold is characterized in terms of estimated potential for further compression of the image given a perceptual similarity constraint, the perceptual similarity constraint setting a limit on an extent of perceptual similarity loss as a result of further compression. Further by way of example, the extent of perceptual similarity loss as a result of further compression is limited to a degree which maintains perceptual identify between the image before compression and the image after compression. Still further by way of example, according to the threshold a compression of the image is regarded as being high, if it is estimated that, given the perceptual similarity loss threshold, less than a minimum compression ratio is achievable through compression of the image. Yet further by way of example, according to the threshold a compression of the image is regarded as being low, if it is estimated that, given the perceptual similarity loss threshold, more than a minimum compression ratio is achievable through compression of the image.

Still further by way of example, the perceptual similarity criterion is associated with a specific perceptual similarity measure or with a combination of specific perceptual similarity measures and with specific configurations thereof. Yet further by way of example, the threshold relates to a specific compression technique or algorithm and specific configurations thereof, and wherein the compressed input image was compressed using corresponding compression technique or algorithm and configurations thereof.

By way of example of the claimed subject matter, the threshold relates to a DCT coefficient value, and a compression of the image is regarded as high if the image's lowest absolute non-zero DCT value is above the DCT coefficient value set forth by the threshold.

By way of example of the claimed subject matter, the method can include determining a threshold by empirically evaluating statistics over a plurality of recompressed images that were compressed to a maximum extent that is allowed by a perceptual similarity constraint, the perceptual similarity constraint setting a limit on an extent of perceptual similarity loss as a result of further compression. Still further by way of example, determining a threshold can include identifying images for which the substantially maximal compression ratio that is achievable by recompressing the images under the perceptual similarity constraint, is below a predefined further compression ratio. Yet further by way of example, determining a threshold can include identifying, based on the plurality of images, a minimum lowest absolute non-zero DCT coefficient which characterizes highly compressed images, being the smallest lowest absolute non-zero DCT value of an image, for which a maximal compression ratio that is achievable by recompression under the perceptual similarity constraint is always, based on the plurality of images, below the predefined further compression ratio. Still further by way of example, the threshold which characterizes highly compressed images is a first threshold, and wherein determining a threshold can further include determining a second threshold, and determining a second threshold can include identifying images for which the substantially maximal compression ratio that is achievable by recompressing the images under the perceptual similarity constraint, is above the predefined further compression ratio. Still further by way of example, determining a second threshold comprises identifying, based on the plurality of images, a maximum lowest absolute non-zero DCT coefficient which characterizes highly compressed images, being the largest lowest absolute non-zero DCT value of an image, for which a maximal compression ratio that is achievable by recompression under the perceptual similarity constraint is always, based on the plurality of images, above the predefined further compression ratio.

Yet further by way of example, an intermediate range of lowest absolute non-zero DCT coefficient is defined between the minimum lowest absolute non-zero DCT coefficient associated with the first threshold and the maximum lowest absolute non-zero DCT coefficient associated with the second threshold. Yet further by way of example, the minimum lowest absolute non-zero DCT coefficient associated with the first threshold and the maximum lowest absolute non-zero DCT coefficient associated with the second threshold are both in the Y plane of an image, and wherein determining a threshold further can include determining a third threshold for classifying images whose lowest absolute non-zero DCT coefficient falls within the intermediate range, and wherein determining a third threshold can include identifying, based on the plurality of images, a minimum lowest absolute non-zero DCT coefficient in the U and V planes which characterizes highly compressed images, being the smallest lowest absolute non-zero DCT value in the U and V planes of an image, for which a maximal compression ratio that is achievable by recompression under the perceptual similarity constraint is always, based on the plurality of images, below the predefined further compression ratio.

For example, if a lowest absolute non-zero DCT coefficient in the Y plane of the compressed input image is the intermediate range, determining a compression level classification can include classifying a compressed input image as being highly compressed if the lowest absolute non-zero DCT coefficient in the U and V planes are both above the third threshold. For example, the third threshold comprises a different threshold for DCT coefficients in each of the U and V planes.

According to an example of the claimed subject matter, the classification threshold is sensitive to a certain characteristic or to a certain component of the compressed input image and wherein applying a threshold to the dequantized DCT coefficients can include adapting the threshold according to a certain characteristic or to a certain component of the compressed input image. Still further by way of example, the threshold is sensitive to one or more of the following: a spatial resolution of the compressed input image, the variability of DCT coefficients between neighboring blocks of the compressed input image and the frequency content of the compressed input image.

According to a further aspect of the claimed subject matter there is provided a program storage device readable by machine, tangibly embodying a program of instructions executable by the machine to perform a method of classifying a compressed input image's compression level. The program storage device readable by machine, tangibly embodying a program of instructions executable by the machine to perform a method of classifying a compressed input image's compression level, can include: applying inverse quantization to DCT coefficients extracted from the compressed input image giving rise to dequantized DCT coefficients; applying a threshold to the dequantized DCT coefficients; and determining a compression level classification for the compressed input image according to a relation among the threshold and at least one of the dequantized DCT coefficients.

According to yet a further aspect of the claimed subject matter there is provided a computer program product including a computer useable medium having computer readable program code embodied therein of classifying a compressed input image's compression level, the computer program product. The computer program product can include a computer useable medium having computer readable program code embodied therein of classifying a compressed input image's compression level, the computer program product can include: a computer readable program code for causing the computer to apply inverse quantization to DCT coefficients extracted from the compressed input image giving rise to dequantized DCT coefficients; a computer readable program code for causing the computer to apply a threshold to the dequantized DCT coefficients; and a computer readable program code for causing the computer to determine a compression level classification for the compressed input image according to a relation among the threshold and at least one of the dequantized DCT coefficients.

According to yet a further aspect of the claimed subject matter there is provided a computerized apparatus for classifying a compressed input image's compression level. By way of example, computerized apparatus for classifying a compressed input image's compression level can include an inverse quantizer, a configuration module, and a DCT-domain classifier. The inverse quantizer can be adapted to apply inverse quantization to DCT coefficients extracted from the compressed input image giving rise to dequantized DCT coefficients. The configuration module can be adapted to provide a classification threshold associated. The DCT-domain classifier can be adapted to apply the classification threshold to the dequantized DCT coefficients, and adapted to determine a compression level classification for the compressed input image according to a relation among the classification threshold and at least one of the dequantized DCT coefficients.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 3A-3D collectively illustrate a recompression process of a 16×16 pixel area, where an initial coarse quantization matrix is used followed by a recompressing using a fine quantization matrix, in accordance with an example of the claimed subject matter;

FIGS. 4A-4D collectively illustrate a compression process of a 16×16 pixel area, where low energy DCT coefficients are Zeroed to reduce bitrate and the modified DCT values matrix is quantized using a fine quantization matrix (such as all 1's), according to one example of the claimed subject matter;

FIGS. 6A-6D illustrate part of a process of identifying highly compressed images, in accordance with an example of the claimed subject matter;

FIG. 7 is illustrates by way of example a data structure including parameters which may be used to determine a threshold that can be used by a method of identifying highly compressed images, in accordance with an example of the claimed subject matter;

FIG. 8A is a graphical illustration of a manner by which classification thresholds can be defined using the lowest non-zero DCT values in the Y plane of images which were recompressed according to a perceptual similarity criterion and whose compression was evaluated using a further compression criterion, according to an example of the claimed subject matter; and FIG. 8B is a graphical illustration of a manner by which classification thresholds can be defined using the lowest non-zero DCT values in the U and V planes of images which were recompressed according to a perceptual similarity criterion and whose compression was evaluated using a further compression criterion, according to an example of the claimed subject matter.

Figure 1:
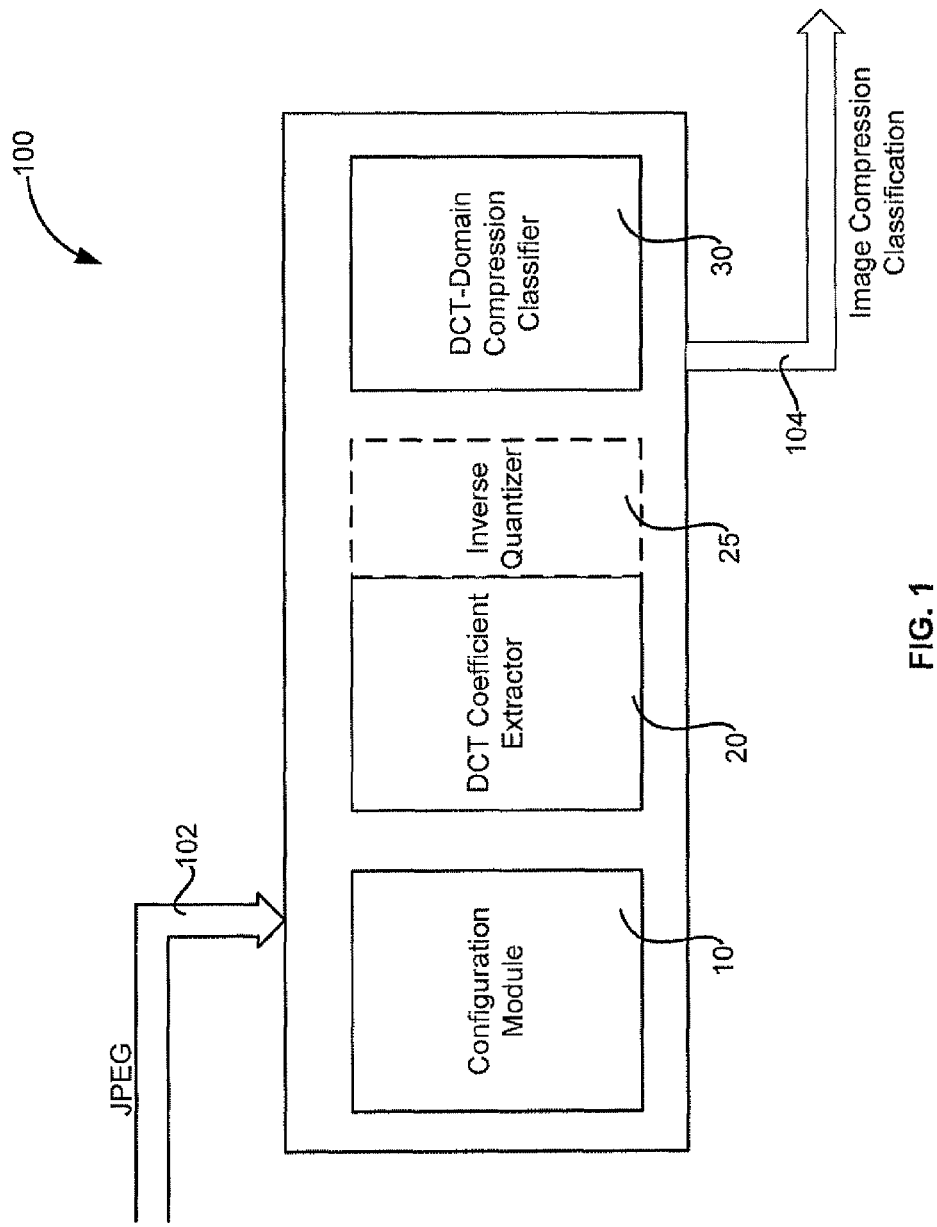
FIG. 1 a block diagram illustration of a system for classifying an image's compression level, according to an example of the claimed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures and components have not been described in detail so as not to obscure the claimed subject matter.

Unless specifically stated otherwise, as apparent from the following discussions, it is appreciated that throughout the specification discussions utilizing terms such as "processing", "computing", "calculating", "analyzing", "determining", "compressing", "quantizing" "de-quantizing" "transforming", "generating", "identifying", "assigning", "encoding", "decoding", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Examples of the claimed subject matter can include apparatuses for performing the operations herein. This apparatus may be specially constructed for the desired purposes, or it can comprise a general purpose computer selectively activated or reconfigured by a computer program stored in the computer. Such a computer program can be stored in a non-transitive computer readable storage medium, such as, but not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EE-PROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, examples of the claimed subject matter are not described with reference to any particular programming language. It will be appreciated that a variety of programming languages can be used to implement the teachings of the claimed subject matter described herein.

Throughout the description of the claimed subject matter and in the claims, reference is made to the term "perceptual quality measure" and to the interchangeable term "perceptual similarity measure", or the like. The terms "perceptual quality measure" or "perceptual similarity measure" as used herein relate to a measure that provides a numerical value indicating the subjective perceptual quality or similarity of an image relative to a reference image. By way of example, a perceptual similarity/quality measure can be expected to be highly correlated with the differential-mean-opinion-score for the evaluated image relative to the reference image. Examples of perceptual quality measures include, but are not limited to: PSNR (Peak Signal-to-Noise Ratio), SSIM (Structural Similarity Index Measure), VIF (Visual Information Fidelity), MSU (Moscow State University) blockiness, MSU (Moscow State University) blurriness, PQS (Picture Quality Scale), VQM (Video Quality Metric) and PEVQ (Perceptual Evaluation of Video Quality). Further examples of perceptual quality measures include a similarity measure which includes an added artifactual edges measure, and a perceptual similarity measure which is based on a combination of a texture measure and a local similarity measure. The latter perceptual quality measures are disclosed in U.S. Provisional Application No. 61/329,217, filed on Apr. 29, 2010, which is hereby incorporated by reference in its entirety. The latter perceptual quality measures are also disclosed in U.S. Provisional Application No. 61/383,750, filed on Sep. 17, 2009, which is hereby incorporated by reference in its entirety. The latter perceptual quality measures are also disclosed in a PCT application entitled "Apparatus and Methods for Recompression of Digital Images", which is filed on the same date as the present application and is hereby incorporated by reference in its entirety.

Throughout the description of the claimed subject matter and in the claims, reference is made to the term "highly-compressed input image" or in short "highly-compressed image" or the like. The term "highly-compressed input image" (and also the term "highly-compressed image") is used in the description and in the claims to characterize a compression of an input image in terms of estimated potential further compression (sometimes referred to herein as "recompression") and estimated perceptual-quality loss as a result of such further compression. In the description and in the claims, the compression of an input image is regarded or is classified as being "high", if, for a given (already) compressed input image, any further significant compression would reduce a perceptual quality of the image beyond a perceptual quality threshold. In this regard, a compressed input image that is regarded according to the claimed subject matter as being "highly compressed", is a compressed image which given a perceptual similarity (or quality) constraint, is evaluated to allow only a limited extent of further compression (less than significant) without breaching the given perceptual quality constraint.

It would be appreciated that in this regard, the use of the adjective "high" in the term "highly-compressed input image" is not meant to limit the compression level of the input image, nor to characterize it. The compression level, or more accurately the further compression potential of an input compressed image, is characterized by a perceptual quality/similarity criterion and a further compression criterion, and these criteria may be set as desired or as appropriate for the underlying application. For example, the claimed subject matter can be used to as part of or in association with a perceptually lossless or with a perceptually lossy recompression process, and may control either of these process so that recompression of a given compressed input image is enabled only if it is determined by a process in accordance with the claimed subject matter that significant further compression can be achieved without breaching a perceptual similarity constraint. The perceptual similarity constraint may dictate that the recompression process be perceptually lossless or it may it may allow perceptual lossy compression and be used to control the recompression process, so that, for example, perceptual similarity is kept above a certain perceptual similarity threshold.

Throughout the description and the claims, the evaluation of a compression level of a compressed input image is carried out using a specific perceptual quality measure and specific configurations for the specific perceptual quality measure. It would be appreciated that different perceptual similarity measures may yield different results in this regard when used to evaluate a given image, including in terms of the perceptual quality loss (or lack thereof) of a recompressed image relative to an input compressed image. Thus, throughout the description and the claims, any reference made to a highly-compressed input image, which as mentioned above is evaluated in terms of the potential for further compression versus perceptual-quality loss as a result of such further compression, relates to a specific compression technique (or algorithm) and using specific configurations.

Throughout the description of the claimed subject matter and in the claims, reference is made interchangeably to the terms "significant compression" and "significant further compression" or to the terms "significant compression potential" and "significant further-compression potential" or the like. These terms are used in the description and in the claims to characterize a minimal further compression (potential). The minimal further compression potential may be used as a criterion in combination with a perceptual quality/similarity criterion. The minimal further compression potential criterion together with the perceptual quality/similarity criterion can be used to determine whether a given compressed input image can be further compressed by at least an extent which is defined by the minimal further compression potential without breaching the perceptual quality/similarity criterion.

Throughout the description of the claimed subject matter and in the claims, reference is made to the terms "compressed input image file" or the like. As used in the description and in the claims, this term relates to the computer resource that is used for storing and organizing any information which is required by the computer in order to render a compressed image. By way of example, a compressed input image file can include image data and metadata, where metadata includes compression data, which in turn includes details and data related to the compression that was applied to the image. The compression data may be required for decoding the image, For certain compressed images, the compression data can include a quantization matrix and/or a scaling factor (e.g., in case a scaled standard quantization matrix was used) that were used for the latest compression of the image, and which are required in order to reconstruct the image.

There is provided according to an aspect of the claimed subject matter a system and a method of classifying an image's compression level. According to an example, the method classifying an image's compression level can include applying inverse quantization to DCT coefficients extracted from the compressed input image giving rise to dequantized DCT coefficients; applying a predetermined threshold to said dequantized DCT coefficients, the predetermined threshold is associated with a perceptual similarity measure; and determining a compression level classification for said compressed image according to a relation among said predetermined threshold and at least one of said dequantized DCT coefficients. For convenience, this process of classifying a compressed input image and any herein disclosed variation thereof is sometimes referred to herein as the "classification process"

Reference is now made to FIG. 1, which is a block diagram illustration of a system for classifying an image's compression level, according to an example of the claimed subject matter. According to an example, a system for classifying an image's compression level 100 can include: a configuration module 10, a DCT coefficient extractor 20 and a DCT-domain compression classifier 30. Optionally, the DCT coefficient extractor 20 can include or be associated with an inverse quantizer 25.

Figure 2:
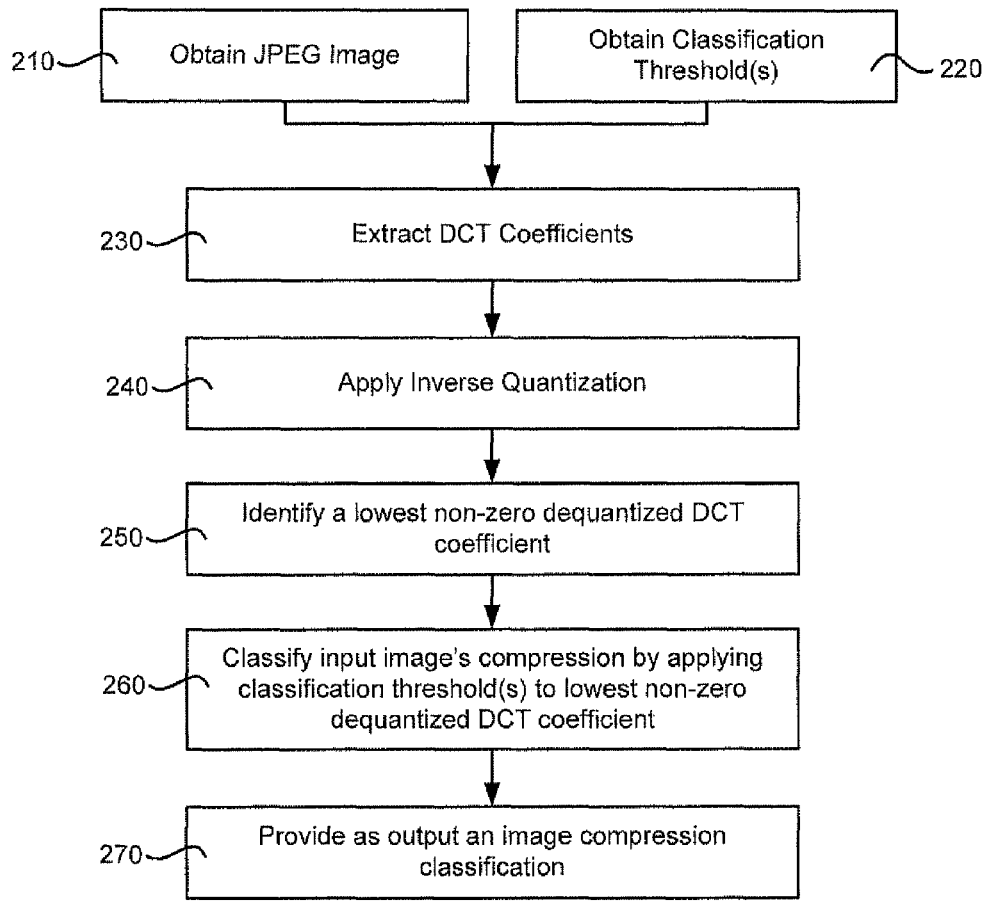
FIG. 2 is a flowchart illustration of a method of classifying an image's compression level, according to an example of the claimed subject matter.

Reference is now additionally made to FIG. 2, which is a flowchart illustration of a method of classifying an image's compression level, according to an example of the claimed subject matter. At block 210 a compressed input image 102 is obtained. For example, the compressed input image 102 is a PEG image. In addition, classification threshold(s) can be obtained (block 220). By way of example, the classification threshold(s) can include a minimum absolute non-zero DCT coefficient. Possibly additional configurations for the classification process may be obtained, such as a configuration with respect to which data from the compressed input image should be examined, as will be further discussed below.

According to an example of the claimed subject matter, the classification threshold(s) is associated with a perceptual similarity measure. For example, the classification threshold(s) is determined using a perceptual similarity measure, as will be described below. Still further by way of example, a perceptual similarity measure may be utilized to determine an acceptable (or unacceptable) minimum absolute non-zero DCT coefficient. Such a threshold may be applied after a dequantization of the input compressed image, as will also be described below.

By way of example, the classification threshold(s) may be recorded within configuration module 10, and the configuration module 10 may initialize the DCT-domain compression classifier 30 with the appropriate classification threshold(s) during initialization of the classification process. As an example, in case the threshold(s) that is selected using the perceptual similarity measure relates for use in the classification process relates to a minimum absolute non-zero DCT coefficient, the DCT-domain compression classifier 30 may be configured with a certain value which relates to a minimum absolute non-zero DCT coefficient. This value can be used as threshold for classifying a compressed input image as being "highly compressed" or not, as will be explained below.

Further by way of example, the classification threshold(s) can be fixed, i.e., they can be hardcoded into the configuration module 10 (or into the DCT-domain compression classifier 30), or in another example, the classification threshold(s) can be dynamic, and the DCT-domain compression classifier 30 can be reconfigured from time-to-time with a different value(s). In yet a further example, the value which constitutes the classification threshold(s) can depend upon a certain characteristic or upon a certain component of the compressed input image, such as the image spatial resolution, the variability of DCT coefficients between neighboring blocks, the frequency content of the image as seen for instance in the DCT coefficient histograms, etc.

For instance, the threshold may be sensitive to and may be adapted according to the spatial resolution of the compressed input image. Further by way of example, for images with low spatial resolution the threshold may be adapted such that when lower minimum absolute non-zero DCT values are identified in such image, they would be classified as highly compressed relative to the minimum absolute non-zero DCT values that are used for classifying images with higher spatial resolution as being highly compressed. In another example, the threshold may be sensitive to and may be adapted according to low energy and/or dispersion of the non DC DCT coefficients. Further by way of example, for images characterized by low energy and/or dispersion of the non DC DCT coefficients the threshold may be adapted such that when lower minimum absolute non-zero DCT values are identified in such images, they would be classified as highly compressed, relative to the minimum absolute non-zero DCT values that are used for classifying images that are characterized by higher energy and/or dispersion of the non DC DCT coefficients as highly compressed.

In an example of the claimed subject matter, a plurality of thresholds can be implemented as part of the classification process. Further by way of example, each of the plurality of thresholds can be associated with a perceptual similarity measure and may relate to a different characteristic or component of the compressed input image. For example, and as will be described below, a threshold may be provided for each of the Luma and Chroma components of the compressed input image, and the plurality of thresholds may be used as part of the classification process.

In a further example, in addition to classification threshold(s) that is (or are) associated with a perceptual similarity measure, at least one other threshold, which is not related to a perceptual similarity measure, can be used as part of the classification process. For instance, it may be determined that in addition to the constraint imposed by the perceptual measure a certain threshold (generally higher than the one introduced by the perceptual measure constraint), may be also used for the classification. For example, for any recompression process, regardless of the perceptual similarity criteria used, if the lowest non-zero DCT coefficient is above a given, substantially high threshold, the image is necessarily "highly compressed". As an extreme example, if there are no non-zero non DC DCT coefficients the image can be classified as "highly compressed"—in this case the threshold is essentially infinity.

Having described with some detail the configuration of the classification process and the thresholds which may be utilized as of it, the description of FIGS. 1 and 2 is now resumed, at block 230, the DCT coefficient extractor 20 may be utilized to extract the DCT coefficient from the input image 102, in a manner know per se. An inverse quantizer 25 may apply inverse quantization to the extract DCT coefficients (block 240), also in a manner know per se.

It would be appreciated that in some cases, high compression ratio can be identified by analyzing the quantization matrix of a compressed input image. The claimed subject matter may optionally use known methods for identifying a highly compressed input image by looking at the quantization matrix which is part of or is otherwise associated with the input compressed-image file. However, such an analysis is, as was mentioned above, merely an optional added feature of the classification method, and the claimed subject matter includes at least an analysis of the dequantized DCT coefficients, as described below, and since the latter analysis is performed on the dequantized DCT coefficients, it is insensitive to the quantization matrix which is part of or associated with the input compressed image file.

After dequantization (block 240), the lowest absolute non-zero dequantized DCT coefficient can be identified (block 250), for example by the DCT-domain compression classifier 30. Next, the DCT-domain compression classifier 30 can classify the input image's compression, for example, by applying the classification threshold(s) to the lowest absolute non-zero dequantized DCT coefficient (block 260). By way of example, the threshold(s) is intended to characterize a compression of an input image (e.g., WEG input image 102) in terms of estimated potential further compression and estimated perceptual-quality loss as a result of such further compression. More specifically, and further by way of example, the threshold(s) can set forth a DCT coefficient value, that below (or above) which the compression of the compressed input image is estimated as not likely to allow any significant further compression (recompression) without degrading perceptual quality beyond a certain degree. Further by way of example, the threshold(s) can be configured so that from a perceptual perspective, as evaluated by a perceptual similarity measure, further compression of the compressed input image is limited to an extent which is estimated to maintain a perceptual identity among the compressed input image and a recompressed image. Further details with regard to the application of the classification threshold(s) are discussed below.

Finally, the classification of the input image's compression 104 can then be provided as output (block 270).

It would be appreciated that by performing a compression classification routine which includes analyzing the dequantized DCT coefficients, the method according to the claimed subject matter can identify compression and/or recompression steps which were applied to the compressed input image or to a previous version of the compressed input image, and which are not reflected by the quantization matrix in the input image file. For example, the method according to the claimed subject matter can identify compression and/or recompression steps which modified the DCT coefficients in the input images regardless of the application of the quantization matrix to the DCT coefficients of the input image.

Reference is now made to FIGS. 3A-3D, which collectively illustrate a recompression process of a 16×16 pixel area, where an initial coarse quantization matrix is used followed by a recompressing using a fine quantization matrix, in accordance with an example of the claimed subject matter. In FIG. 3A there is shown an illustration of a 16×16 matrix which represents a zoom into a 16×16 pixel area of an original RAW image. The values in the 16×16 pixel matrix 310 represent actual Luma plane pixel intensity values.

The RAW image of which a 16×16 pixel area 310 is shown in FIG. 3A may undergo compression. For example, as part of the compression, a DCT transformation may be applied to the pixel values of the RAW image and the resulting DCT coefficient may be rounded. FIG. 3I3 is an illustration of a 16×16 matrix of (rounded) DCT coefficients 320 which were calculated over the 16×16 matrix of pixel values shown in FIG. 3A. As an example, the 16×16 matrix of DCT coefficients 320 shown in FIG. 3B was calculated according to the DCT transformation defined in the JPEG standard in a manner known per se. As can be seen in FIG. 3B, the 16×16 matrix of DCT coefficients 320 are the rounded Luma plane DCT coefficients.

In FIG. 3C, there is shown a 16×16 matrix of quantized DCT coefficients, which was calculated by applying coarse quantization to the 16×16 matrix of DCT coefficients of FIG. 313. As an example, the 16×16 matrix of quantized DCT coefficients 330 shown in FIG. 3C was calculated according to the JPEG standard, and using the default quantization matrix provided by the standard and a scaling factor, in a manner known per se. Essentially, the 16×16 matrix of quantized DCT coefficients 330 represents a result of a first compression process that was applied to the input 16×16 pixel values matrix 310.

As can be seen in FIG. 3C, the 16×16 matrix of quantized DCT coefficients 330 includes the Luma plane DCT coefficients from the 16×16 matrix of DCT coefficients 320 of shown in FIG. 3B after being quantized with a coarse quantization matrix.

Looking at the 16×16 matrix of DCT coefficients 320 (in FIG. 3B) and at the quantized values in the counterpart 16×16 matrix of quantized DCT coefficients 330 indicates that significant compression was applied to the 16×16 pixel values matrix 310. It would be appreciated that if the compressed image was now analyzed to determine its compression level, it may have been possible to determine that the image is highly compressed by looking at the (coarse) quantization matrix which is part of or is otherwise associated with the input compressed-image file, in a manner know per se.

Reference is now made to FIG. 3D, which is an illustration of a 16×16 matrix of dequantized DCT coefficients of a compressed image, which was created inter-alia by applying a second compression process to the compressed image that was previously compressed by a first compression process. As was mentioned above, the DCT transformation over the 16×16 pixel values matrix 310, and the quantization of the 16×16 matrix of DCT coefficients 320 which yielded the 16×16 matrix of quantized DCT coefficients 330 were part of a first compression process wherein a course quantization matrix was used. The matrix of dequantized DCT coefficients 340 in FIG. 3D is a result of a second compression process (recompression) that was applied over a compressed image which is the result of the first compression process.

By way of example, as part of the second compression process, the compressed image which was the result of the first compression process (where a coarse quantization matrix was used) underwent an inverse quantization (using the coarse quantization matrix), an inverse DCT transformation, a second DCT transformation (the DCT applied during the first compression process being a first DCT transformation), and a second quantization process (the quantization during the first compression process being a first quantization process), this time, the second quantization was carried out using a fine quantization matrix (e.g., a quantization matrix consisting of all 1's). It would be appreciated by those versed in the art, the in such a scenario, the significant compression that was applied to the original RAW image as part of the first compression process, would not be apparent from the compressed-image file after the second compression process (recompression), and if a fine quantization matrix was used as part of the second compression process, the compressed-image file would include the fine quantization, and thus looking only at the quantization matrix for classifying the level of compression that was applied to the input compressed image 102 can be misleading. The claimed subject matter includes at least an analysis of the dequantized DCT coefficients, and since this analysis is performed on the dequantized DCT coefficients, it is insensitive to the quantization matrix which is part of or associated with the input compressed image file.

By way of example, in case a compressed input image 102, which was subjected to compression (first compression process) and a subsequent recompression (second compression process), by way of example as described above with reference to FIGS. 3A and 3B, is received by at classification system 100 according to the claimed subject matter, the classification thereof would include at least an analysis that is based on the dequantized DCT coefficients of the input image 102, and being based on the dequantized DCT coefficients, this analysis is insensitive to the quantization matrix which is part of or associated with the input compressed image file, which may be misrepresent the actual compression which was applied to the original image.

Moving now to FIGS. 4A-4D, which collectively illustrate a compression process of a 16×16 pixel area, where low energy DCT coefficients are Zeroed to reduce bitrate and the modified DCT values matrix is quantized using a fine quantization matrix (such as all 1's), according to one example of the claimed subject matter. In FIG. 4A there is shown an illustration of a 16×16 matrix which represents a zoom into a 16×16 pixel area of an original RAW image. The values in the 16×16 pixel matrix 410 represent actual Luma plane pixel intensity values.

The RAW image of which a 16×16 pixel area is shown in FIG. 4A may undergo compression. For example, as part of the compression, a DCT transformation may be applied to the pixel values of the RAW image and the resulting DCT coefficient may be rounded. FIG. 4B is an illustration of a 16×16 matrix of (rounded) DCT coefficients which were calculated over the 16×16 matrix of pixel values shown in FIG. 4A. As an example, the 16×16 matrix of DCT coefficients 420 shown in FIG. 4B was calculated according to the PEG standard in a manner known per se. As can be seen in FIG. 4B, the 16×16 matrix of DCT coefficients 420 includes some non-zero DCT coefficients with low absolute values such as +−1.in the low energy area As part of the compression process illustrated by FIGS. 4A-4D, the DCT coefficients may be zeroed. Reference is now made to FIG. 4C, which is an illustration of a modified 16×16 matrix of DCT coefficients, after zeroing some low energy DCT coefficients from the original 16×16 matrix of DCT coefficients shown in FIG. 4B have been subjected to zeroing. As an example, in the modified 16×16 matrix of DCT coefficients 430 shown in FIG. 4C, all the low energy DCT coefficients, in this example-coefficients with absolute values of 4 and below, have been subjected to zeroing. It would be appreciated that by zeroing low energy DCT coefficients, the file size or bit rate of the image (or in this case a 16×16 pixel area thereof) can be reduced, while maintaining compatibility with standard JPEG decoders.

As an example, DCT coefficients zeroing may be implemented as part of the compression (encoding) process of the RAW input image and may be applied to the low energy DCT coefficients. It would be appreciated that DCT coefficient's zeroing in conjunction with standard compression steps, such as JPEG compression steps for example, can yield a standard compressed image, such as a standard JPEG image.

DCT coefficients zeroing may be implemented as a manual routine, and an operator may select which DCT coefficients should be zeroed, or in another example, an automatic routine may be implemented for zeroing DCT coefficient as part of a compression process, such as a JPEG compression process. The specifics of the DCT coefficients zeroing, including any logic and/or algorithms which may be implemented in this regard are outside the scope of the claimed subject matter, and can be implemented using any presently known or yet to be devised in the future method, technique or routine.

After the DCT coefficients zeroing takes place, practically compressing the respective portion of the original RAW image, a quantization process can be implemented, for example, in accordance with the JPEG standard. By way of example, a fine quantization matrix (e.g., all 1s) may be applied to the modified 16×16 matrix of DCT coefficients. It would be appreciated that even when a fine quantization matrix is used, significant compression may still result due to the DCT coefficients zeroing.

Reference is now made to FIG. 4D, which is an illustration of a 16×16 matrix of dequantized DCT coefficients of a compressed image, the compressed image created, inter-alfa, by applying a fine quantization matrix (e.g., all 1s) to the modified 16×16 DCT coefficient matrix (after DCT coefficients zeroing) shown in FIG. 4C. As was mentioned above, the compressed image, which can be provided as an input compressed image 102 to the classification system 100 according to the claimed subject matter, may have been generated by a compression process that was applied to an original image (e.g., non-compressed image), an which included, inter-alia performing a DCT transformation over the pixel values of the original image (represented above by the 16×16 pixel values matrix 410), giving rise to a matrix of DCT coefficients (represented above by the 16×16 matrix of modified DCT coefficients 420), applying DCT coefficients zeroing over the matrix of DCT coefficients, giving rise to a matrix of modified DCT coefficients (represented above by the 16×16 matrix of modified DCT coefficients 430), and applying a fine quantization matrix over the matrix of modified DCT coefficients. It would be appreciated by those versed in the art, that in such a scenario, the significant compression that was applied to the original RAW image through DCT coefficients zeroing (and not through quantization), would not be apparent from the compressed-image file, and if a fine quantization matrix was used in the compression process, the compressed-image file would include the fine quantization matrix, and thus looking only at the quantization matrix for classifying the level of compression that was applied to the input compressed image 102 can be misleading. The claimed subject matter includes at least an analysis of the dequantized DCT coefficients, and since this analysis is performed on the dequantized DCT coefficients, it is insensitive to the quantization matrix which is part of or associated with the input compressed image file.

By way of example, in case a compressed input image 102, which was subjected to during the compression thereof to a DCT zeroing process, by way of example as described above with reference to FIGS. 3A and 3B, is received at the classification system 100 according to the claimed subject matter, the classification thereof would include at least an analysis that is based on the dequantized DCT coefficients of the input image 102, and being based on the dequantized DCT coefficients, this analysis is insensitive to the quantization matrix which is part of or associated with the input compressed image file, which may be misrepresent the actual compression which was applied to the original image.

As already mentioned above, by way of example, the value which constitutes the classification threshold(s) can depend upon a certain characteristic or upon a certain component of the compressed input image, for example the threshold may be associated with the Luma and/or with the Chroma planes of the image, and the image may be classified by comparing its dequantized DCT coefficients in the Luma and/or in the Chroma plane(s) against respective threshold(s) associated specifically with DCT coefficients in the Luma and/or in the Chroma plane(s).

Further by way of example, and as was also mentioned above, a plurality of thresholds can be implemented as part of the classification process. Still further by way of example, each of the plurality of thresholds can relate to a different characteristic or component of the compressed input image. For example, a threshold may be provided for each of the Luma and Chroma components of the compressed input image, and the plurality of thresholds may be used as part of the classification process.

Figure 5:
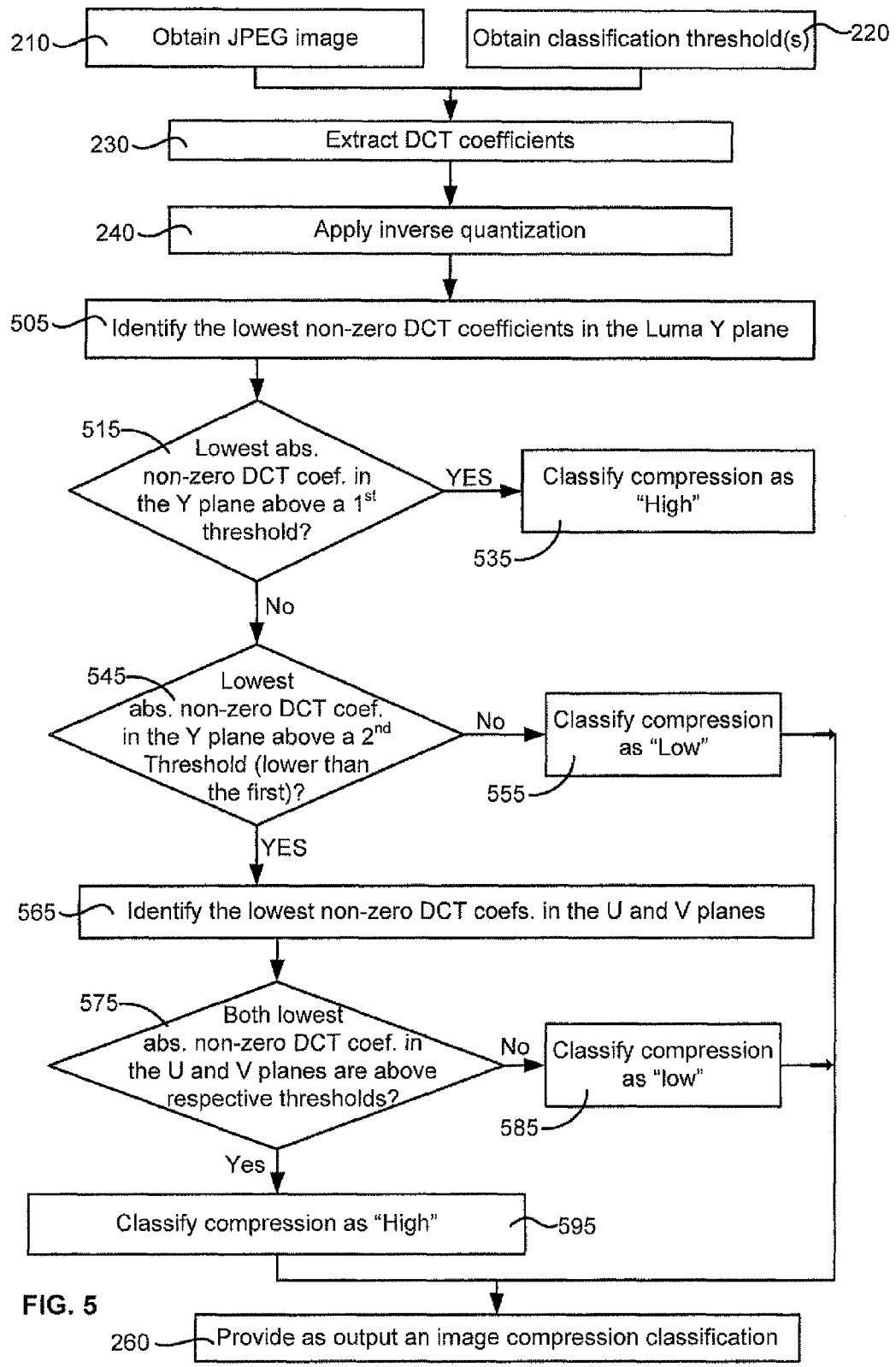
FIG. 5 is a flowchart illustration of a method of classifying an image's compression level, including applying a threshold over dequantized DCT coefficients in each of the Luma and Chroma planes of a compressed input image, according to an example of the claimed subject matter.

There is now provided a description of an example of a method of classifying an image's compression, which includes implementing a threshold over dequantized DCT coefficients in each of the Luma and Chroma planes of a compressed input image. Reference is now made to FIG. 5 which is a flowchart illustration of a method of classifying an image's compression level, including applying a threshold over dequantized DCT coefficients in each of the Luma and Chroma planes of a compressed input image, according to an example of the claimed subject matter. The process shown in FIG. 5 begins with the system obtaining a compressed input image (e.g., a JPEG image) (block 210), and obtaining classification thresholds (block 220). These blocks are similar to the respective blocks that were described above with reference to FIG. 2, with the difference that in block 220 a plurality of thresholds are obtained one for each of the Luma and Chroma planes of the compressed input image.

Next, the quantized DCT coefficients can be extracted from the compressed input image (block 230), and inverse quantization can be applied (block 240) in order to obtain the compressed input image's dequantized DCT coefficients. These blocks are also similar to the respective that were described above with reference to FIG. 2, with the difference that the DCT extraction is used to extract the DCT coefficients in each of the Luma and Chroma planes of the compressed input image, and the inverse quantization is applied to the quantized DCT coefficients in each of the Luma and Chroma planes, thereby giving rise to dequantized DCT coefficients in each of the Luma and Chroma planes.

Once the dequantized DCT coefficients in each of the Luma and Chroma planes are obtained, the lowest non-zero DCT coefficient in the Y (Luma) plane is identified (block 505). Next, it is determined whether the lowest absolute non-zero DCT coefficient in the Y plane is above a first threshold (block 510)—the first threshold corresponding to dequantized DCT values in the Y plane. By way of example, the first threshold is intended to characterize a compression of an input image (e.g., MEG input image 102) in terms of estimated potential further compression and estimated perceptual-quality loss as a result of such further compression. More specifically, and further by way of example, the first threshold may set forth a DCT value in the Y plane that above which the compression of the compressed input image is estimated as not likely to allow any significant further compression (recompression) without degrading perceptual quality beyond a certain degree. Further by way of example, the first threshold can be configured so that from a perceptual perspective, as evaluated by a perceptual similarity measure, further compression of the compressed input image is limited to an extent which maintains perceptual identity among the compressed input image and the recompressed image.

By way of example, in case in block 510 it is determined that the lowest absolute non-zero DCT coefficient in the Y plane is above the first threshold, the compression of the compressed input image is classified as "high" (block 535) and this classification can be provided as output (block 260). A Y plane dequantized DCT coefficients matrix, which illustrates the case where the compression is classified as "high" based on the lowest absolute non-zero DCT coefficient in the Y plane, is illustrated by FIG. 6A. Say that according to a threshold for classifying an input compressed image, any compressed image whose Y plane dequantized. DCT coefficients matrix does not include absolute non-zero DCT coefficient in the Y plane which are lower than 5, shall be classified as highly compressed, than the compressed input image associated with the Y plane dequantized DCT coefficients matrix shown in FIG. 6A would be classified as highly compressed, since this matrix does not have values whose absolute non-zero value is lower than 5.

By way of example, in case at block 510 it is determined that the lowest absolute non-zero DCT coefficient in the Y plane is not above a first threshold, the process moves to determine whether the lowest absolute non-zero DCT coefficient in the Y plane is above a second threshold, the second threshold being lower than the first (block 545). By way of example, the second threshold is also intended to characterize a compression of an input image (e.g., JPEG input image 102) in terms of estimated potential further compression and estimated perceptual-quality loss as a result of such further compression, but in the case of the second threshold, it may set forth a DCT value in the Y plane that below which the compression of the compressed input image is estimated as likely to allow significant further compression (recompression) without degrading perceptual quality beyond a certain degree.

Accordingly, by way of example, in case block 545 it is determined that the lowest absolute non-zero DCT coefficient in the Y plane is not above the second threshold, the compression of the compressed input image is classified as "low" (block 555) and this classification can be provided as output (block 260). A Y plane dequantized DCT coefficients matrix, which illustrates the case where the compression is classified as "low" based on the lowest absolute non-zero DCT coefficient in the Y plane, is illustrated by FIG. 6B. Say, that according to a threshold for classifying an input compressed image, any compressed image whose Y plane dequantized DCT coefficients matrix includes absolute non-zero DCT coefficient in the Y plane which are lower than 2 (or equal to 1), shall be classified as being a low compression image, than the compressed input image associated with the Y plane dequantized DCT coefficients matrix shown in FIG. 6B would be classified as not highly compressed, since this matrix has values whose absolute non-zero value is 1.

By way of example, if, however, at block 510 it was determined that the lowest absolute non-zero DCT coefficient in the Y plane is not above a first threshold, and now at block 545 it is determined that the lowest absolute non-zero DCT coefficient in the Y plane is above the second threshold, the dequantized DCT coefficients in the Y plane of the compressed input image are considered ambiguous in terms of the ability to determine the likelihood that any significant further compression (recompression) would degrade perceptual quality beyond a certain degree or not.

By way of example, in order to resolve this ambiguity, at least to some degree, the classification process can proceed to block 565, where the lowest non-zero DCT coefficients in both the U and V (Chroma) planes are identified, followed by block 575, where it is determined whether both the lowest non-zero DCT coefficient in both the U and V (Chroma) planes are above respective thresholds. By way of example, a third threshold is provided in association with the lowest non-zero DCT coefficients in the U plane, and a fourth threshold is provided in association with the lowest non-zero DCT coefficients in the V plane. Further by way of example, the third and the fourth thresholds are similar in some respects to the first threshold, and each of the third and the fourth thresholds is intended to characterize a compression of an input image (e.g., PEG input image 102) in terms of estimated potential further compression and estimated perceptual-quality loss as a result of such further compression. More specifically, and further by way of example, each of the third and the fourth thresholds can set forth for each of the U and V planes a respective DCT value, and if the lowest absolute non-zero DCT value in both the U and V planes is above the respective thresholds, the compression of the compressed input image is estimated as not likely to allow any significant further compression (recompression) without degrading perceptual quality beyond a certain degree. Further by way of example, the third and the fourth thresholds can be configured so that from a perceptual perspective, as evaluated by a perceptual similarity measure, further compression of the compressed input image is limited to an extent which maintains perceptual identity among the compressed input image and the recompressed image. Further by way of example, a single threshold can be provided for both the Chroma components U and V, and the dequantized U and V coefficients are each checked to yield a single unified decision, e.g. the lowest non-zero DCT coefficients in the U and in the V (Chroma) planes are (or are not) above a third threshold.

If it is determined at block 575 that at least one of the lowest non-zero DCT coefficient in both the U and V (Chroma) planes is below the respective thresholds, the compression of the compressed input image is classified as "low" (block 585) and this classification can be provided as output (block 260). Dequantized DCT coefficients matrices for each of the Y, U and V planes of the input image, which illustrate the case where the dequantized DCT coefficients matrix for the Y plane is ambiguous, and the compression of the input image is classified as being low according to the dequantized DCT coefficients matrices for the U and V planes, is illustrated by FIG. 6C. Say that the lowest absolute non-zero DCT coefficient in the Y plane matrix 606 is two, and thereby (according to the above mentioned first and second thresholds) at block 515 a "No" is returned, and at block 545 a "Yes" is returned (and thus the dequantized DCT coefficients matrix in the Y plane is ambiguous), the process can proceed to classification based on the dequantized DCT matrices in the Chroma plane. Say, that in such a case any compressed image (or any image whose dequantized DCT coefficients matrix in the Y plane is ambiguous), where at least one of the U or V plane dequantized DCT coefficients matrix includes a value which is equal to or lower than 3, shall be classified as being a "low compression" image, than the compressed input image associated with the dequantized DCT coefficients matrices for the U and V planes 616 and 626, respectively, would be classified as a low compression image, since the dequantized DCT coefficients matrix's for (in this case both) the U and V planes 616 and 626 include a value whose absolute non-zero value is 3.

If, however, it is determined at block 575 that the lowest non-zero DCT coefficient in both the U and V (Chroma) planes are above a third threshold, the compression of the compressed input image is classified as "high" (block 595) and this classification can be provided as output (block 260). This case is illustrated by FIG. 6D, where the dequantized DCT coefficients matrix for the Y plane is ambiguous, and the compression of the input image is classified as being high according to the dequantized DCT coefficients matrices for the U and V planes. By way of example, the Y plane matrix 608 is the same as 606 and the same thresholds are used, and so at block 515 a "No" is returned, and at block 545 a "Yes" is returned, but this time, say that the lowest absolute non-zero DCT coefficient in the matrices for the U and V planes 618 and 628, respectively is 7, and say that according to the threshold for the U and V planes (here, as en example, an identical threshold is used for both the U and V planes) a compressed input image is classified as "highly compressed" if the dequatized DCT coefficient matrix for both the U and V planes minimum non-zero absolute value is above 3, and therefore since the lowest absolute non-zero DCT coefficient in both the U and V matrices 618 and 628, respectively, is 7, than the compressed input image would be classified as a highly compressed.

Having described with some detail various possible implementation of a process of classifying an image's compression level according to examples of the claimed subject matter, the determination of a classification threshold(s), and the manner by which a perceptual similarity measure is used for determining classification threshold(s) shall now be the focus of the description. As mentioned above, a perceptual similarity measure is used in the classification process according to the claimed subject matter to characterize a compression of an input image in terms of estimated potential further compression (recompression) and estimated perceptual-quality loss as a result of such further compression. More specifically, and further by way of example, the threshold(s) can set forth a DCT coefficient value, that below (or above) which the compression of the compressed input image is estimated as not likely to allow any significant further compression (recompression) without degrading perceptual quality beyond a certain degree. Further by way of example, the threshold(s) can be configured so that from a perceptual perspective, as evaluated by a perceptual similarity measure, further compression of the compressed input image is limited to an extent which is estimated to maintain a perceptual identity among the compressed input image and a recompressed image.

By way of example, further compression of an input image is regarded or is classified as being "high", if, it is estimated that for a given (already) compressed input image, any further significant compression would reduce a perceptual quality of the image beyond a perceptual quality threshold. In this regard, a compressed input image that is regarded according to the claimed subject matter as being "highly compressed", is a compressed image which given a perceptual similarity (or quality) constraint, is evaluated to allow only a limited extent of further compression (less than significant) without breaching the given perceptual quality constraint.

As part of an example of the claimed subject matter, the classification of an input compressed image can be based on an evaluation of the dequantized DCT coefficients against one or more thresholds, where the threshold(s) is determined based on a perceptual similarity measure. Further by way of example, the threshold(s) may be associated with a minimal perceptual similarity which should be maintained between the compressed input image and a recompressed image (generated by further compressing the input image), and an estimated further compression which can be achieved by compressing the image to such an extent. Thus, by way of example, the classification threshold(s) determination process may be associated with a minimal further compression criterion in combination and with a perceptual quality/similarity criterion. The threshold(s) may be use to classify which compressed input images can be further compressed, and the classification can be regarded as an estimate as to whether a given compressed input image can be further compressed by at least an extent which is defined by the minimal further compression criterion without breaching the perceptual quality/similarity criterion.

By way of example, the classification threshold(s) relates to a minimum absolute non-zero DCT coefficient and is applied on the dequantized DCT coefficients as explained above. Further by way of example, the classification threshold(s) may relate to a different characteristic or component of the compressed input image, for example, to either the Y (Loma) U, or V (Chroma) planes of the compressed input image.

By way of example, the classification threshold(s) can be determined by empirically evaluating statistics over a plurality of recompressed images (compressed images which are a result of a further compression of an already compressed image), that were recompressed to a maximal extent according to a perceptual similarity criterion and for which the achieved recompression rate was lower than a further compression criterion. Thus for example, in case the perceptual similarity criterion requires that the recompressed image is perceptually identical to the compressed input image, the extent of further compression that is allowed would be constrained by a requirement that the recompressed image is maintained perceptually identical to the image prior to the recompression process.

By way of example, the classification threshold(s) can be determined by empirically evaluating statistics only over a plurality of recompressed images for which the further compression ratio under the perceptual similarity constraint was not in agreement with the further compression criterion (e.g., it was too low). By way of further example, the classification threshold(s) can be determined by empirically evaluating statistics only over a plurality of recompressed images for which the further compression ratio under the perceptual similarity constraint met the further compression criterion (e.g., it was sufficiently high). Still further by way of example, the classification threshold(s) can be determined by empirically evaluating statistics over both of the above groups of images, and possibly by empirically evaluating statistics over other groups of images, e.g., various "intermediate" images in case a plurality of thresholds are used.

By way of example, for each one of the plurality of images, the extent of further compression achieved through the recompression process (under the above constraints) is recorded. The lowest absolute non-zero DCT coefficients in the input image are also recorded. By way of further example, the lowest absolute non-zero DCT coefficients in each of the Y, U and V planes of the input image are recorded. An example of a data structure which may be used to record the above data in respect of a plurality of images is shown in FIG. 7.

FIG. 8A is a graphical illustration of a manner by which classification thresholds can be defined using the lowest non-zero DCT values in the Y plane of images which were recompressed according to a perceptual similarity criterion and whose compression was evaluated using a further compression criterion, according to an example of the claimed subject matter. According to an example, a plurality of images can be recompressed to a maximal degree which is estimated to maintain a perceptual identity between the compressed input image and a recompressed image. A minimal compression criterion or threshold is set, for example, manually by an operator, and is applied over the plurality of compressed input images, and the recorded absolute non-zero DCT values of the compressed input images are classified in accordance with the minimal further compression criterion.

For example, the lowest absolute non-zero DCT values in the Y plane of images for which a recompression ratio that is below the value set forth by the further recompression criterion are recorded. By way of example, this lowest absolute non-zero DCT value can be used as a (first) threshold for identifying compressed input images whose compression ratio should be regarded as "high" (e.g., the first threshold used to identify the images classified as highly compressed in block 535), and compressed input images whose lowest absolute non-zero DCT value is equal to or above the selected lowest absolute non-zero DCT value would be classified as being highly compressed.

From another perspective, and by way of example, a first threshold for classifying compressed input images as "highly compressed" can be characterized by a lowest absolute non-zero DCT value of images for which perceptually lossless further compression is limited and does not exceed a certain ratio. With reference to FIG. 8A, and further by way of example, the lowest absolute non-zero DCT value of images for which perceptually lossless further compression is limited and does not exceed a certain ratio is 3 or above. Thus, in this example, a threshold may be set according to which any image whose lowest absolute non-zero DCT value is 3 or above would be classified as being highly compressed.

By way of example, in addition to recording the lowest absolute non-zero DCT values of images for which a recompression ratio that is below the value set forth by the recompression criterion, the lowest absolute non-zero DCT values of images for which a recompression ratio that is above the value set forth by the recompression criterion are recorded. By way of example, this lowest absolute non-zero DCT value can be used as a (second) threshold for identifying compressed input images whose compression ratio should be regarded as "low" (e.g., the second threshold used to identify the images classified as being a low compression image in block 555), and compressed input images whose lowest absolute non-zero DCT value is equal to or below the selected lowest absolute non-zero DCT value would be classified as being a low compression image.

From another perspective, and by way of example, a second threshold for classifying compressed input images as a "low compression" image can be characterized by a lowest absolute non-zero DCT value of images for which perceptually lossless further compression exceeds a certain ratio. With reference to FIG. 8A, and further by way of example, the lowest absolute non-zero DCT value of images for which perceptually lossless further compression exceeds a certain ratio is 1 or below. Thus, in this example, a threshold may be set according to which any image whose lowest absolute non-zero DCT value is 1 or below would be classified as being a low compression image. As can be seen for example in FIG. 8A, in between the first threshold (used for classifying images as highly compressed or not) and the second threshold (used for classifying images as being low compression image or not) there may exist an intermediate group of images whose lowest absolute non-zero DCT coefficients in the Y plane fall within an intermediate range between the first and the second thresholds. By way of example, within the intermediate range are lowest absolute non-zero DCT coefficients which can not conclusively classify corresponding images as being highly compressed or low compression images, since at least some images having an absolute non-zero DCT coefficient in the intermediate range, when compressed to a maximal degree which is estimated to maintain a perceptual identity among the compressed input image and a recompressed image provided a compression ratio which is below the value set forth by the further recompression criterion and some other images having an absolute non-zero DCT coefficient in the intermediate range provided a compression ratio which is above the value set forth by the further recompression criterion, and so there is ambiguity within the intermediate range of the lowest absolute non-zero DCT coefficients in the Y plane.

With reference to FIG. 8A, and further by way of example, the intermediate range of lowest absolute non-zero DCT value of images for which perceptually lossless further compression is considered ambiguous is above 1 and below 3.

By way of example, classification thresholds can be defined using the lowest non-zero DCT values in the Chroma U and V planes of images which were recompressed according to a perceptual similarity criterion and whose compression was evaluated using a further compression criterion, can be provided. The classification thresholds over the lowest non-zero DCT values in the U and V planes can be used in case the classification based on the DCT values in the Y plane results in an ambiguity, as described above.

Reference is now made to FIG. 8B, which is a graphical illustration of a manner by which classification thresholds can be defined using the lowest non-zero DCT values in the U and V planes of images which were recompressed according to a perceptual similarity criterion and whose compression was evaluated using a further compression criterion, according to an example of the claimed subject matter.

For example, the lowest absolute non-zero DCT values in the U and V planes of images for which a recompression ratio that is below the value set forth by the further recompression criterion are recorded. By way of example, this lowest absolute non-zero DCT value can be used as a (third) threshold for identifying compressed input images whose compression ratio should be regarded as "high" or as "low". Two separate threshold can be provided for each of the U and V planes, or an identical threshold may be used, as appropriate according to the perceptual similarity criterion and the further compression criterion.

For example, with reference to FIG. 8B assuming the threshold for both the U and V planes is 3, any compressed input image whose lowest absolute non-zero DCT value in the Y plane is ambiguous, and having lowest absolute non-zero DCT values in both the U plane and in the V plane which are (in both planes) above 3 is regarded as being highly compressed. And any compressed input image whose lowest absolute non-zero DCT value in the Y plane is ambiguous, and having a lowest non-zero DCT value in at least one of the U and V planes which is equal to or 3 is regarded as being a low compression image.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A program storage device readable by machine, tangibly embodying a program of instructions executable by the machine to perform a method of classifying a compressed input image's compression level, comprising:
    applying inverse quantization to discrete cosine transform (DCT) coefficients extracted from the compressed input image giving rise to dequantized DCT coefficients;
    identifying a lowest absolute non-zero DCT coefficient among said dequantized DCT coefficients;
    applying a threshold to said dequantized DCT coefficients,
    wherein said applying a threshold includes applying a threshold to said lowest absolute non-zero DCT coefficient; and
    determining a compression level classification for said compressed input image according to a relation among said threshold and at least one of said dequantized DCT coefficients,
    wherein said determining a compression level classification, comprises determining a compression level classification for said compressed image according to a relation among said threshold and said lowest absolute non-zero DCT coefficient.

2. The method according to claim 1, wherein applying a threshold comprises applying a plurality of thresholds which relate to different characteristics or components of the compressed input image.

3. The method according to claim 1, wherein the threshold includes a threshold that is related to DCT coefficients in the Luma (Y) plane.

4. The method according to claim 1, wherein the plurality of thresholds include a threshold that is related to DCT coefficients in the Luma (Y) plane of the compressed input image, and further include a threshold or thresholds that is/are related to DCT coefficients in each of the Chroma planes (U and V).

5. The method according to claim 4, wherein said applying a threshold comprises applying a first threshold to said dequantized DCT coefficients in the Luma (Y) plane, and said determining a compression level comprises classifying said image's compression level as high if its lowest absolute non-zero DCT value in the Luma (Y) plane is above the first threshold.

6. The method according to claim 5, wherein said applying a threshold comprises applying a second threshold to said dequantized DCT coefficients in the Luma (Y) plane, and said determining a compression level comprises classifying said image's compression level as low if its lowest absolute non-zero DCT value in the Luma (Y) plane is below the second threshold.

7. The method according to claim 6, wherein in case the image's lowest absolute non-zero DCT value in the Luma (Y) plane is not above said first threshold or below said second threshold, said applying a threshold comprises applying a third threshold and a fourth threshold to dequantized DCT coefficients in the Chroma U plane and to dequantized DCT coefficients in the Chroma V plane, respectively, and said determining a compression level comprises classifying said image's compression level as high if its lowest absolute non-zero DCT value in the Chroma U plane is above the respective third threshold and its lowest absolute non-zero DCT value in the Chroma V plane is above the respective fourth threshold.

8. The method according to claim 7, wherein said third and fourth thresholds are identical.

9. The method according to claim 6, wherein in case the image's lowest absolute non-zero DCT value in the Luma (Y) plane is not above said first threshold or below said second threshold, said applying a threshold comprises applying a third threshold and a fourth threshold to dequantized DCT coefficients in the Chroma U plane and to dequantized DCT coefficients in the Chroma V plane, respectively, and said determining a compression level comprises classifying said image's compression level as low if its lowest absolute non-zero DCT value in the Chroma U plane is below the respective third threshold or its lowest absolute non-zero DCT value in the Chroma V plane is below the respective fourth threshold.

10. The method according to claim 1, wherein said threshold is related to a perceptual similarity criterion and to a further compression criterion.

11. The method according to claim 10, wherein said threshold is characterized in terms of estimated potential for further compression of said image given a perceptual similarity constraint, the perceptual similarity constraint setting a limit on an extent of perceptual similarity loss as a result of further compression.

12. The method according to claim 11, wherein the extent of perceptual similarity loss as a result of further compression is limited to a degree which maintains perceptual identify between the image before compression and the image after compression.

13. The method according to claim 11, wherein according to said threshold a compression of said image is regarded as being high, if it is estimated that, given the perceptual similarity loss threshold, less than a minimum compression ratio is achievable through compression of said image.

14. The method according to claim 11, wherein according to said threshold a compression of said image is regarded as being low, if it is estimated that, given the perceptual similarity loss threshold, more than a minimum compression ratio is achievable through compression of said image.

15. The method according to claim 10, wherein said perceptual similarity criterion is associated with a specific perceptual similarity measure or with a combination of specific perceptual similarity measures and with specific configurations thereof.

16. The method according to claim 15, wherein said threshold relates to a specific compression technique or algorithm and specific configurations thereof, and wherein said compressed input image was compressed using corresponding compression technique or algorithm and configurations thereof.

17. The method according to claim 11, wherein said threshold relates to a DCT coefficient value, and a compression of said image is regarded as high if the image's lowest absolute non-zero DCT value is above the DCT coefficient value set forth by the threshold.

18. The method according to claim 1, further comprising determining a threshold by empirically evaluating statistics over a plurality of recompressed images that were compressed to a maximum extent that is allowed by a perceptual similarity constraint, the perceptual similarity constraint setting a limit on an extent of perceptual similarity loss as a result of further compression.

19. The method according to claim 18, wherein said determining a threshold comprises identifying images for which the substantially maximal compression ratio that is achievable by recompressing said images under the perceptual similarity constraint, is below a predefined further compression ratio.

20. The method according to claim 19, wherein said determining a threshold comprises identifying, based on said plurality of images, a minimum lowest absolute non-zero DCT coefficient which characterizes highly compressed images, being the smallest lowest absolute non-zero DCT value of an image, for which a maximal compression ratio that is achievable by recompression under the perceptual similarity constraint is always, based on said plurality of images, below the predefined further compression ratio.

21. The method according to claim 20, wherein the threshold which characterizes highly compressed images is a first threshold, and wherein said determining a threshold further comprises determining a second threshold, and wherein said determining a second threshold comprises identifying images for which the substantially maximal compression ratio that is achievable by recompressing said images under the perceptual similarity constraint, is above the predefined further compression ratio.

22. The method according to claim 21, wherein said determining a second threshold comprises identifying, based on said plurality of images, a maximum lowest absolute non-zero DCT coefficient which characterizes highly compressed images, being the largest lowest absolute non-zero DCT value of an image, for which a maximal compression ratio that is achievable by recompression under the perceptual similarity constraint is always, based on said plurality of images, above the predefined further compression ratio.

23. The method according to claim 22, wherein an intermediate range of lowest absolute non-zero DCT coefficient is defined between the minimum lowest absolute non-zero DCT coefficient associated with the first threshold and the maximum lowest absolute non-zero DCT coefficient associated with the second threshold.

24. The method according to claim 23, wherein the minimum lowest absolute non-zero DCT coefficient associated with the first threshold and the maximum lowest absolute non-zero DCT coefficient associated with the second threshold are both in the Y plane of an image, and wherein said determining a threshold further comprises determining a third threshold for classifying images whose lowest absolute non-zero DCT coefficient falls within the intermediate range, and wherein said determining a third threshold comprises identifying, based on said plurality of images, a minimum lowest absolute non-zero DCT coefficient in the U and V planes which characterizes highly compressed images, being the smallest lowest absolute non-zero DCT value in the U and V planes of an image, for which a maximal compression ratio that is achievable by recompression under the perceptual similarity constraint is always, based on said plurality of images, below the predefined further compression ratio.

25. The method according to claim 24, wherein if a lowest absolute non-zero DCT coefficient in the Y plane of the compressed input image is the intermediate range, said determining a compression level classification comprises, classifying a compressed input image as being highly compressed if the lowest absolute non-zero DCT coefficient in the U and V planes are both above the third threshold.

26. The method according to claim 24, wherein said third threshold comprises a different threshold for DCT coefficients in each of the U and V planes.

27. The method according to claim 1, wherein said threshold is sensitive to a certain characteristic or to a certain component of the compressed input image and wherein said applying a threshold to said dequantized DCT coefficients comprises adapting said threshold according to a certain characteristic or to a certain component of the compressed input image.

28. The method according to claim 27, wherein said threshold is sensitive to one or more of the following: a spatial resolution of the compressed input image, the variability of DCT coefficients between neighboring blocks of the compressed input image and the frequency content of the compressed input image.

29. A computer program product comprising a computer useable medium having computer readable program code embodied therein of classifying a compressed input image's compression level, the computer program product comprising:

computer readable program code for causing the computer to apply inverse quantization to discrete cosine transform (DCT) coefficients extracted from the compressed input image giving rise to dequantized DCT coefficients, computer readable program code for causing the computer to identify a lowest absolute non-zero DCT coefficient among said dequantized DCT coefficients;
computer readable program code for causing the computer to apply a threshold to said dequantized DCT coefficients,
the computer readable program code for causing the computer to apply a threshold including computer readable program code for causing the computer to apply a threshold to said lowest absolute non-zero DCT coefficient; and
computer readable program code for causing the computer to determine a compression level classification for said compressed input image according to a relation among said threshold and at least one of said dequantized DCT coefficients,
the computer readable program code for causing the computer to determine a compression level classification including computer readable program code for causing the computer to determining a compression level classification for said compressed image according to a relation among said threshold and said lowest absolute non-zero DCT coefficient.

30. A computerized apparatus for classifying a compressed input image's compression level, comprising:
an inverse quantizer adapted to apply inverse quantization to discrete cosine transform (DCT) coefficients extracted from the compressed input image giving rise to dequantized DCT coefficients;
a configuration module adapted to provide a classification threshold associated; and
a DCT-domain classifier adapted to identify a lowest absolute non-zero DCT coefficient among said dequantized DCT coefficients, adapted to apply the classification threshold to the dequantized DCT coefficients including applying the classification threshold to said lowest absolute non-zero DCT coefficient, and adapted to determine a compression level classification for the compressed input image according to a relation among the classification threshold and at least one of the dequantized DCT coefficients including determining the compression level classification for said compressed image according to a relation among said threshold and said lowest absolute non-zero DCT coefficient.

* * * * *